(12) United States Patent
Loce et al.

(10) Patent No.: US 6,944,341 B2
(45) Date of Patent: Sep. 13, 2005

(54) LOOSE GRAY-SCALE TEMPLATE MATCHING FOR IMAGE PROCESSING OF ANTI-ALIASED LINES

(75) Inventors: Robert P. Loce, Webster, NY (US); Clara Cuciurean-Zapan, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 796 days.

(21) Appl. No.: 09/768,161

(22) Filed: Jan. 24, 2001

(65) Prior Publication Data

US 2001/0038712 A1 Nov. 8, 2001

Related U.S. Application Data

(60) Provisional application No. 60/200,877, filed on May 1, 2000.

(51) Int. Cl.[7] .............................. G06K 9/00; G06K 9/62
(52) U.S. Cl. ....................... 382/209; 382/269; 382/190; 382/299
(58) Field of Search .................................. 382/190, 209, 382/181, 299, 282, 269, 266, 264, 218, 217, 278; 345/611–616

(56) References Cited

U.S. PATENT DOCUMENTS

| | | | | |
|---|---|---|---|---|
| 5,444,552 A | * | 8/1995 | Smith, III | 358/465 |
| 6,002,800 A | * | 12/1999 | Donelly et al. | 382/216 |
| 6,463,176 B1 | * | 10/2002 | Matsugu et al. | 382/195 |
| 6,678,426 B1 | * | 1/2004 | Bearss et al. | 382/299 |

FOREIGN PATENT DOCUMENTS

| | | |
|---|---|---|
| EP | 0 448 956 A2 | 10/1991 |
| EP | 0 744 705 A2 | 11/1996 |
| EP | 0 768 792 A2 | 4/1997 |

* cited by examiner

Primary Examiner—Bhavesh M. Mehta
Assistant Examiner—John Strege
(74) Attorney, Agent, or Firm—Oliff & Berridge, PLC

(57) ABSTRACT

An anti-aliased, or gray-edged, image is characterized by comparing the image to a number of loose-templates having a plurality of elements and at least one element having a range greater than zero. As families of loose-templates are compared to the anti-aliased input image, one or more sets of patterns, or features, are recognized and extracted to produce various screens of features that generally describe the anti-aliased input image. An arbitration technique is then performed on the sets of features to produce feature vectors which, in turn, can be used to control line-widths within the anti-aliased input image.

33 Claims, 18 Drawing Sheets

T = (0,63,91,0)
δ = 32

T = (0,63,191,0)
δ = (0,32,112,32)

LOOSE GRAY-SCALE TEMPLATE MATCHING FOR IMAGE PROCESSING OF ANTI-ALIASED LINES

BACKGROUND OF THE INVENTION

1. Field of Invention

The invention relates to methods and systems for processing anti-aliased digital images.

2. Description of Related Art

Anti-aliased line art has become increasingly available to the printing industry. As a result, the ability to perform the same type of processing techniques on anti-aliased line art as those that are available to process binary line art is desirable. For example, it is desirable to control the line widths of anti-aliased line art when converting from a first resolution to a second resolution. Additionally, processes such as document cleaning, document restoration and image enhancement are desirable for anti-aliased line art just as much as for binary line art.

SUMMARY OF THE INVENTION

This invention provides methods and systems for processing anti-aliased line art.

In various exemplary embodiments of the methods and systems according to this invention, an anti-aliased, or gray-edged, image is characterized by comparing the input image to a number of loose-templates. Each loose-template has a plurality of image elements and at least one of the image elements in the loose-template has a range greater than zero.

The loose-templates can be organized into families. As families of loose-templates are compared to the anti-aliased input image, one or more sets of patterns, or features, are recognized and extracted to produce sets of features or feature vectors that generally describe the anti-aliased input image. An arbitration technique is then performed on the sets of features to produce a reduced set of features or feature vectors which, in turn, can be used to control line-widths of the anti-aliased line art within the anti-aliased input image.

Other features and advantages of the various exemplary embodiments of the methods and systems of this invention are described below or are apparent from the accompanying drawings and from the detailed descriptions which follow.

BRIEF DESCRIPTION OF THE DRAWINGS

Various exemplary embodiments of the loose-templates and various exemplary embodiments of loose-template applying systems and methods of this invention is described in detail with regard to the following figures, wherein like numerals reference like elements, and wherein.

DETAILED DESCRIPTION OF PREFERRED EMBODIMENTS

This invention provides methods and systems for processing anti-aliased line art. The term "anti-aliased line art" refers to a wide range of image types including, but not limited to, text and graphics that possess gray edges, gray-scale continuous tone (contone) image data and color images, where at least one color image separation can be treated as a gray-scale image. Furthermore, an anti-aliased image can be any binary image such as digital images, hardcopy images, page description language (PDL) images, or any other descriptive image form that is subsequently transformed to an anti-aliased image data. Various transformation techniques can include any known or later developed processing technique capable of transforming binary images into anti-aliased images such as computer-based transformations or physical scanning of hardcopy images.

A conventional template, or templet, is a pattern or gauge that can be used to either recognize or manufacture an image accurately. As applied to digital images, a template can be an image pattern that can recognize, reproduce or manufacture various features in an image and can be embodied in a one or two-dimensional array of distinct image elements. For example, a template can consist of nine image elements arranged in a linear one-dimensional configuration ($x_1, x_2 \ldots x_9$) that, when compared to a similarly-sized portion of an image, can determine whether a specific type and/or width of line exists within the image portion. Similarly, a template can be a two-dimensional array of numbers ($x_{11}, x_{12} \ldots x_{1N}, x_{21} \ldots x_{MN}$) that, when compared to a similarly-sized portion of an image, can determine whether a specific two-dimensional structure exists within the image.

A loose-template, like a template, is a pattern that can be used to recognize or manufacture an image pattern. However, unlike conventional templates, which have an exact value for each image element, the image elements of a loose-template can contain ranges of values. For example, a first image element of a particular template can contain an exact value of zero, but the second image element can contain a range that varies from zero to one-hundred. By comparing an image portion against a loose-template, entire families of similarly shaped patterns or features can be quickly recognized in operations that would otherwise require thousands or even millions of element-by-element comparisons of conventional templates.

Figure 1:
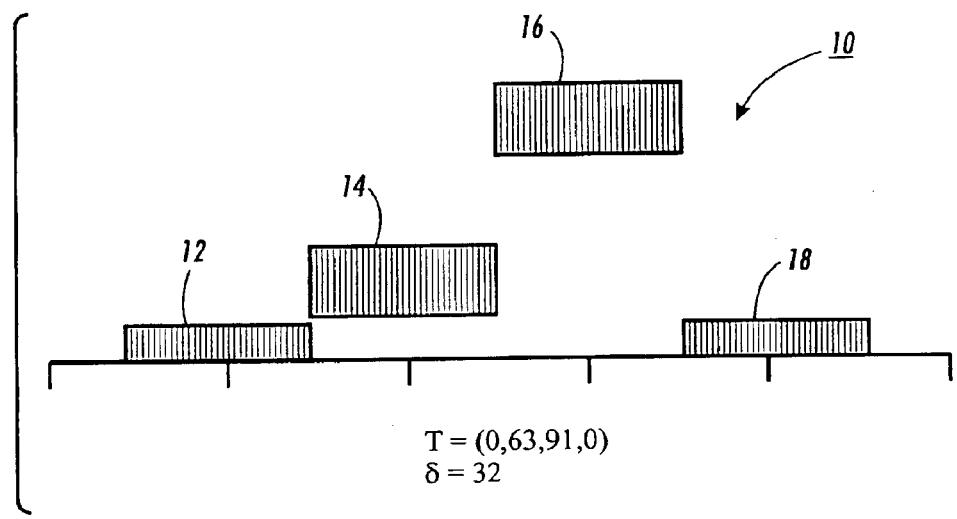
FIG. 1 depicts a first embodiment exemplary of a loose-template profile according to this invention.

FIG. 1 is an exemplary embodiment of a first loose-template 10 having image elements 12, 14, 16 and 18 with target values of T=(0, 63, 191, 0) and a constant span for each image element of plus or minus thirty-two [$\delta$=±32]. Together, each target value and respective span for each image element in the loose-template 10 can be used to define a range for that image element. In various exemplary embodiments, the range is defined as extending from the stated target value less the span value to the stated target value plus the span value. As shown in FIG. 1, because the first and last image elements 12 and 18 have target values of zero, the actual ranges for the image elements 12 and 18 are truncated from zero to thirty-two as the values for the exemplary template are limited to values between zero and $2^n$ where n is the bit-depth of the image data. However, it should be appreciated that any alternative range of values capable of describing anti-aliased images can be used without departing from the spirit and scope of this invention.

When compared to a like-sized portion of an image, i.e., a "windowed" image portion, the first loose-template 10 can qualify, or recognize, the windowed image portion as containing a pattern from a predefined family of patterns if each image element of the windowed image portion falls within the span of each corresponding image element's target value. For example, if the first loose-template 10 were compared against a first image portion $A_1$=(0, 60, 200, 10), the windowed image portion would be classified as containing the feature described by the loose-template 10. This results because the value of each image element of the first image portion $A_1$ falls within the range of the corresponding image element of the first loose-template 10.

In contrast, if the first loose-template 10 is compared against a second image portion $A_2$=(0, 60, 140, 10), the second image portion $A_2$ would not be classified as containing the feature described by the first loose-template 10. This is because the value of the third image element [140] of the second image portion $A_2$ is beyond the range [159, 223] of the third image element 14 of the loose-template 10.

Figure 2:
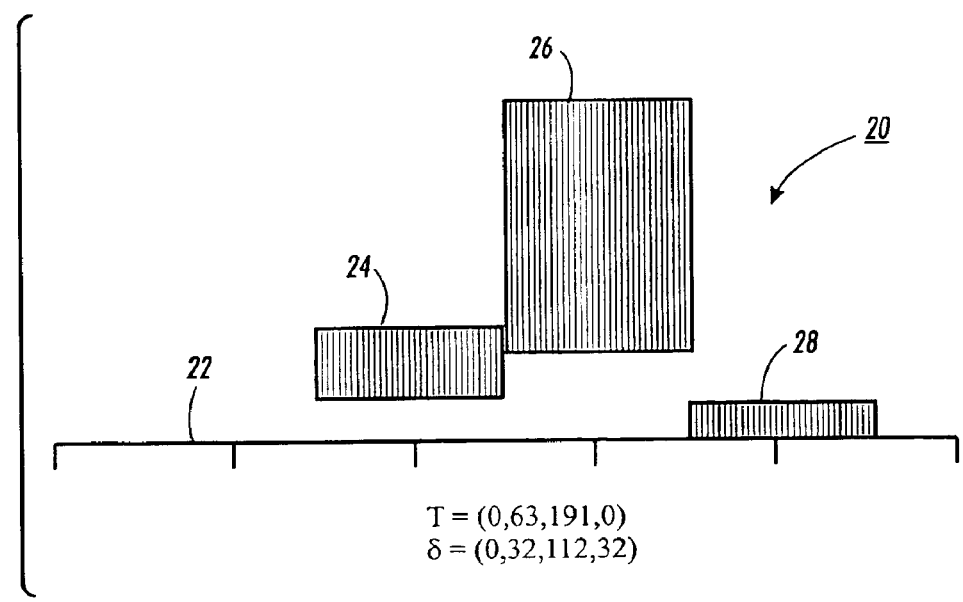
FIG. 2 depicts a second embodiment exemplary of a loose-template profile according to this invention.

FIG. 2 is a exemplary embodiment of a second loose-template 20 having image elements 22, 24, 26 and 28 having the target values T=(0, 63, 191, 0) with respective spans $\delta$=(0, ±32, ±112, ±32). As with the first exemplary loose-template 10 shown in FIG. 1, the values for the second exemplary loose-template 20, are limited to values between zero and $2^n$. However, unlike the first exemplary loose-template 10, the spans for each image element 22–28 of the second exemplary loose-template 20 can vary from one another. As a consequence of the greater span of image element three 26 [±112] of the second exemplary loose-template 20 as compared to the first loose-template 10, comparing the second image portion $A_2$=(0, 60, 140, 10) against the second loose-template 20 can result in a positive feature recognition. This is, of course, because the value of each image element of $A_2$ falls within the range of the corresponding image element of the second loose-template 20.

While FIGS. 1 and 2 depict loose-templates in the form of target image elements with respective spans, it should be appreciated that other approaches to forming loose-templates and respective techniques of pattern recognition that do not require predetermined ranges can alternatively be used. For example, an alternative loose-template having a set of target values can be compared to an image portion according to a sum-of-squared-errors technique, a clustering technique, a neural-network process or any other known or later developed pattern recognition technique that can classify image portions without requiring exact element-by-element matches to a template and can be used without departing from the spirit and scope of this invention.

Figure 3:
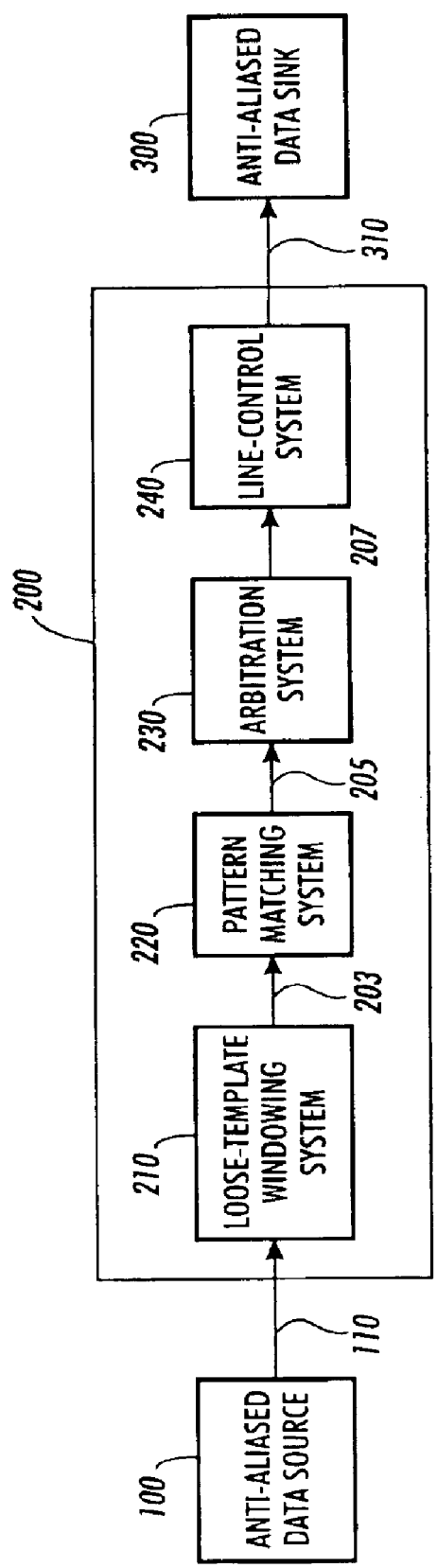
FIG. 3 is a block diagram of a first exemplary embodiment of a system that processes anti-aliased image data according to this invention.

FIG. 3 is a generalized functional block diagram of one exemplary embodiment of a digital imaging system 200 usable to process anti-aliased image data according to this invention. The digital imaging system 200 inputs anti-aliased image data from an anti-aliased data source 100 and outputs processed anti-aliased image data to an anti-aliased data sink 300.

The anti-aliased data source 100 can be any known or later developed device or system that is capable of providing anti-aliased image data to the digital imaging system 200. Similarly, the image data sink 300 can be any known or later developed device or system that is capable of receiving the processed anti-aliased image data output by the digital imaging system 200 and either storing, transmitting, or displaying the processed anti-aliased image data.

In general, the image data source 100 can be any one of a number of different sources, such as a scanner, a digital copier, a facsimile device that is suitable for generating electronic image data, or a device suitable for storing and/or transmitting electronic image data, such as a client or server of a network, of the Internet, and especially the World Wide Web. For example, the image data source 100 may be a scanner, or a data carrier such as a magnetic storage disk, CD-ROM or the like, or a host computer, that contains scanned image data.

Similarly, the image data sink 300 can be any device that is capable of outputting or storing processed image data generated according to the systems and methods according to this invention, such as a printer, a copier or other image forming devices, a facsimile device, a display device, a memory, or the like.

The input anti-aliased image data can be provided by the anti-aliased data source 100 to the digital imaging system 200 through a link 110. Similarly, the processed anti-aliased image data can be provided from the digital imaging system 200 to the image data sink 300 through a link 310. The links 110 and 310 can be any known or later developed devices, software utilities or systems for connecting the digital imaging system 200 to the anti-aliased data source 100 or the anti-aliased data sink 300, including direct cable connections, connections over a wide area network or a local area network, connections over an intranet or an extranet, connections over the Internet, or connections over any other known or later-developed distributed processing network or system.

The digital imaging system 200 includes a loose-template windowing system 210, a pattern matching system 220, an arbitration system 230 and a line-control system 240. The loose-template windowing system 210 receives data from the anti-aliased data source 100 over the link 110 and compares portions of the anti-aliased image data against a number of predetermined loose-templates.

In this first exemplary embodiment of the digital imaging system 200, the loose-template windowing system 210 receives anti-aliased image data from the anti-aliased data source 100 and performs windowing functions on the received image data. That is, the loose-template windowing system 210 can extract portions of the anti-aliased image data that can be compared to like-sized templates. For example, the loose-template windowing system 210 can extract one-by-seven image element portions of the anti-aliased image data and compare the extracted image element portion to one or more loose-templates also having dimensions of one image element by seven image elements. As the loose-template windowing system 210 extracts portions of image data, the extracted image portions are provided to the pattern matching system 220.

In various exemplary embodiments of the digital imaging system 200, the pattern matching system 220 receives the windowed image data and performs pattern matching operations by comparing each image element of the windowed image portions to corresponding image elements of like-sized loose-templates that each contain target values and corresponding spans defining acceptable ranges for each image element of windowed image portions. If each image element of the windowed image portion falls within the corresponding range of each image element of a loose-template, then the pattern matching system 220 provides a "match" indication to the arbitration system 230. Otherwise, if one or more image elements of the windowed image portion falls outside an acceptable range, the pattern matching system 220 provides a "no match" indication to the arbitration system 230.

It should be appreciated that, in various embodiments of the loose-template windowing system 210 and the exemplary pattern matching system 220, multiple comparisons between an image portion and various families of various loose-templates of the same window sizes can be performed. As these families of loose-templates are compared to the image portion, various features that generally describe the image portion can be accumulated by the pattern matching system 220, and as more features are recognized and accumulated, the resultant set of features can more completely describe the image portion.

Furthermore, as different sizes of loose-templates are compared to the input image and feature sets pertaining to the different-sized loose-templates are recognized and accumulated, the extracted features relating to different window sizes can be stored in different sets, or "screens", of features. For example, features extracted by one-by-three image element loose-templates can be stored in a first screen, features extracted by one-by-five image element loose-templates can be stored in a second screen, and so on.

As discussed above, while the exemplary pattern matching system 220 performs the element-by-element matching scheme described above, other forms of loose-templates and pattern matching techniques alternatively can be used that do not require exact element-by-element matches. For example, image portions can be categorized against templates according to a sum-of-squared-errors technique, a clustering technique, a neural-network technique or any other now known or later developed pattern recognition technique than can recognize generalized patterns without requiring exact element-by-element matches.

In other exemplary embodiments of the digital imaging system 200, loose-template pattern matching techniques can be performed by mapping the resolution of a windowed image portion to a lower resolution and then performing a conventional template pattern matching operations on the low-resolution image portion. For example, an image containing eight-bit gray-level data can be mapped to four-bit gray-levels by such processes as truncating the lower four bits of each byte of windowed image data, by more sophisticated mapping techniques such as a non-linear mapping technique or a mapping process based on subjective experiments of human subjects.

By lowering the resolution of an image portion and comparing each low-resolution image element to a corresponding low-resolution image element of a low-resolution loose-template, the ranges of the loose-template image elements can be incorporated into the target values by virtue of their lower resolutions. For example, truncating the lower four bits of eight-bit image elements would create ranges of sixteen for each image element. As an example, for an image portion having eight-bits image elements, all image element values between thirty-two (hexidecimal value=0x20) to forty-seven (0x2f), could truncate to a value of two (0x2) after removing the lower four bits. Consequently, such image elements in an image portion from thirty-two to forty-seven could be qualified by a value of two (0x2) in a corresponding low-resolution image element of a loose-template. The advantage to such high-resolution to low-resolution transforms can include a lowering of the number of comparisons required. For example, a five image element image portion truncated four bits for every image element can be categorized using up to ($2^{4 \times 5}$), or one million forty-eight thousand and five-hundred and seventy-six, fewer comparisons.

Still other exemplary loose-template pattern matching techniques can be performed by mapping the resolution of a windowed image portion to a lower resolution. However, instead of performing an element-by-element comparison against low-resolution loose-templates as described above, each image element of a low-resolution image portion can be arranged to form a vector. For example, the image elements of the eight-bit image potion $A_1$=(0, 60, 140, 10) can be mapped to four-bit image elements $A'_1$=(0, 3, 11, 1) [hexidecimal values=(0x0, 0x3, 0xB, 0x1)] which can subsequently be arranged into a hexadecimal number 0x03B1. This resultant hexadecimal number 0x03B1 can then be used as a vector that can point to a symbolic state-space of loose-template patterns. Alternatively, the resultant number can point to an address in a computer's program space directed toward processing particular features embedded in the image portion.

As image data is categorized according to the exemplary embodiments of the windowing system 210 and the pattern matching system 220, one or more sets, or screens, of features can be provided to the arbitration system 230. According to various embodiments of this invention, the arbitration system 230 can receive the features and arbitrate between different features designated at a particular location to filter out one or more received features. Additionally, the arbitration system 230 can interpret the received features to produce other features based on the received features.

The arbitration/interpretation schemes of the various techniques of the exemplary arbitration system 230 can be formed according to any predetermined set of rules. For example, if three two-image element wide line features are determined to exist at a single location including a left-slanting line, a horizontal-line and a right-slanting line, the arbitration system 230 can filter and discard all but the horizontal line feature.

Alternatively the exemplary arbitration system 230 can interpret spatially related features to derive other categories of features. For example, if four two-image element-wide line features are recognized to exist at a single location including a left-slanting line, a horizontal-line, a right-slanting line and a vertical-line feature, the arbitration system 230 can interpret the separate features as an two-by-two "dot" feature.

Furthermore, as different screens of features are presented to the arbitration system 230, each screen can be processed independently of the other screens. Alternatively, the arbitration system 230 can take advantage of dynamics that can occur between different screens to determining fine angles of lines, fine spacing between lines and the like. For example, screens directed to single element-thick lines can be processed separately from screens directed to thicker lines. Alternatively, as discussed above, separate screens can be processed under a unified set of rules to take advantages of dynamics that can occur between the different graphic types.

In various exemplary embodiments of the digital imaging system 200, the line-control system 240 can receive filtered sets of features or feature vectors and operate on the image data inherent in the features or feature vectors. For example, the line-control system 240 can maintain a line-width when the digital imaging system 200 is translating anti-aliased images from a first resolution to a second resolution. Alternatively, the line-control system 240 can strategically grow or reduce the width of a line, perform document cleaning or any other known or later developed operation useful for processing lines. For example, characters and other image structures can require line widths to be thickened in situations where an image rendering device such as a target printer has a smaller writing spot than is required or otherwise described by a set of graphic commands, such as commands embedded in a PDL image script. Because the writing spot of the target printer is smaller than the desired writing spot, the rendered image can appear thinned, eroded or broken.

Similarly, characters and other image structures can require thinning for the opposite reasons cited above for thickening. That is, when the writing spot of a rendering device such as a target printer is larger than desired, excessively thick lines, characters or other features can appear to distort an image.

Furthermore, in the context of white or comparatively light lines, characters or other features against a black or comparatively dark backgrounds, it can be desirable to perform various adjustments. For example, because inks in various image rendering systems can systematically seep across intended boundaries, it can be desirable to adjustably widen white lines found in black backgrounds to compensate for such seepage thus preserving the intended boundaries of the lines.

In various exemplary embodiments of the digital imaging system 200 directed to line growth, it should be appreciated that the image portions and corresponding templates must be appropriately sized. For example, when the line-control system 240 grows a line from LW image elements by least LG image elements, the window size N can be determined by equation (1):

$$N = (2*\text{ROUNDUP}(LW)) + (4*\text{ROUNDUP}(LG/2)) + 1 \quad (1)$$

where ROUNDUP is the mathematical "ceiling" function, which rounds non-integer numbers up to the nearest integer.

For example, given line-width of two image elements and a desired line growth of three image elements, the digital imaging system 200 would require at least image portions and templates of a size $N=(2*\text{ROUNDUP}(2))+(4*\text{ROUNDUP}(3/2))+1=(2*2)+(4*2)+1=4+8+1=13$ elements.

In still other various exemplary embodiments, the line control system 240 can reduce or eliminate various defects that can occur. For example, as an image has undergone a number of generations of photocopying, it should be appreciated that the density of various features can be lost with each generation of photocopying. Accordingly, characters or other features can be progressively thinned and can break at various weak points. Accordingly, line thickening can restore the various broken lines or other characters.

Figure 4:
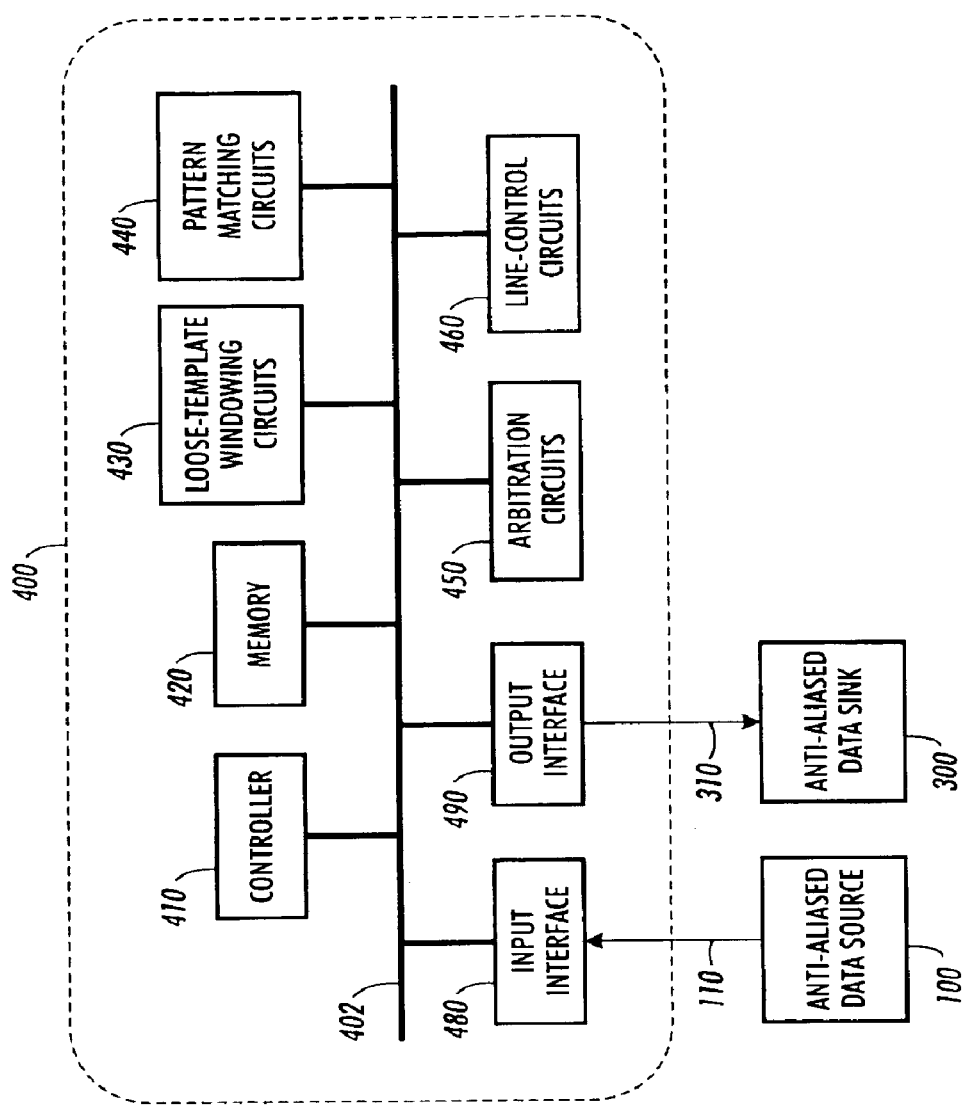
FIG. 4 is a block diagram of a second exemplary embodiment of a system that processes anti-aliased image data.

FIG. 4 is a block diagram of a second exemplary embodiment of the systems usable to process anti-aliased image data according to this invention. As shown in FIG. 4, an anti-aliased image data processing system 400 is connected to the anti-aliased image data source 100 and the anti-aliased image data sink 300 over the links 110 and 310 respectively.

The anti-aliased image data processing system 400 includes a controller 410, a memory 420, loose-template windowing circuits 430, pattern matching circuits 440, arbitration circuits 450, line-control circuits 460, and input-interface 480 and an output interface 490, each interconnected by a data/control bus 402. The links 110 and 310 are connected to the input-interface 480 and output-interface 490, respectively.

In operation, as the anti-aliased data source 100 presents anti-aliased image data to the input-interface 480, the controller 410 transfers the anti-aliased image data to the memory 420. The memory 420 stores the anti-aliased image data, and further stores various families of loose-templates and other image data generated by the anti-aliased image data processing system 400 during image processing.

The loose-template windowing circuits 430, under control of the controller 410, can receive the anti-aliased image data and extract portions of the anti-aliased image data having pre-determined dimensions based on the dimensions of various loose-templates of interest. Under control of the controller 410, the loose-template windowing circuits 430 then can transfer the extracted image portions to the pattern matching circuits 440.

In various exemplary embodiments of the image data processing system 400, the pattern matching circuits 440, under control of the controller 410, can receive the image portions, and further receive a pre-determined number of loose-templates from memory 420. The pattern matching circuits 440 then can perform pattern matching, or feature recognition, operations on the image portions using the loose-templates. As features are recognized, the pattern matching circuits 440 can store the recognized features in a feature map, or screen, located in memory 420. As the pattern matching circuits 440 recognize and store families of features, the pattern matching circuits 440 can arrange the features into a single screen, or alternatively create and manage separate screens for each family of features.

In other various exemplary embodiments of the image data processing system 400, the pattern matching circuits 440 can employ the low-resolution techniques as described above to create one or more screens of features. Still in other exemplary embodiments image data processing system 400, the pattern matching circuits 440 can employ other low-resolution techniques as described above to create screens of feature vectors, as opposed to screens of features.

After the pattern matching circuits 440 produce a number of screens of features or feature vectors, the controller 410 can transfer the feature and/or feature vectors from the memory 420 to the arbitration circuits 450. The arbitration circuits 450 can then perform various operations on the screens such as arbitration/filtering, on the received feature and/or feature vectors. Alternatively, the arbitration circuits 450 can perform one or more interpretation operations to classify new features or designate new feature vectors based on the features and/or feature vectors presented to it. After the arbitration circuits 450 perform their various operations on the sets of features or feature vectors, the controller 410 transfers the resulting features or feature vectors to the line-control circuits 460.

The line-control circuits 460, under control of the controller 410, then perform one or more operations on the arbitrated data such as maintaining a line-width, growing or shrinking a line-width, document cleaning and the like. As discussed above, as anti-aliased line art becomes increasing available to the printing industry, problems encountered in the past in processing high quality binary line art can arise in anti-aliased line art. Accordingly, it should be appreciated that the line control circuits 460 can perform a large number of analogous operations found in binary line-art as well as various new operations not anticipated by binary-line art. As line-control operations are processed, the line-control circuits 460, under control of the controller 410, can export the processed image data to the anti-aliased image data sink 300 through the output interface 490 and over the link 310.

Figure 5A:
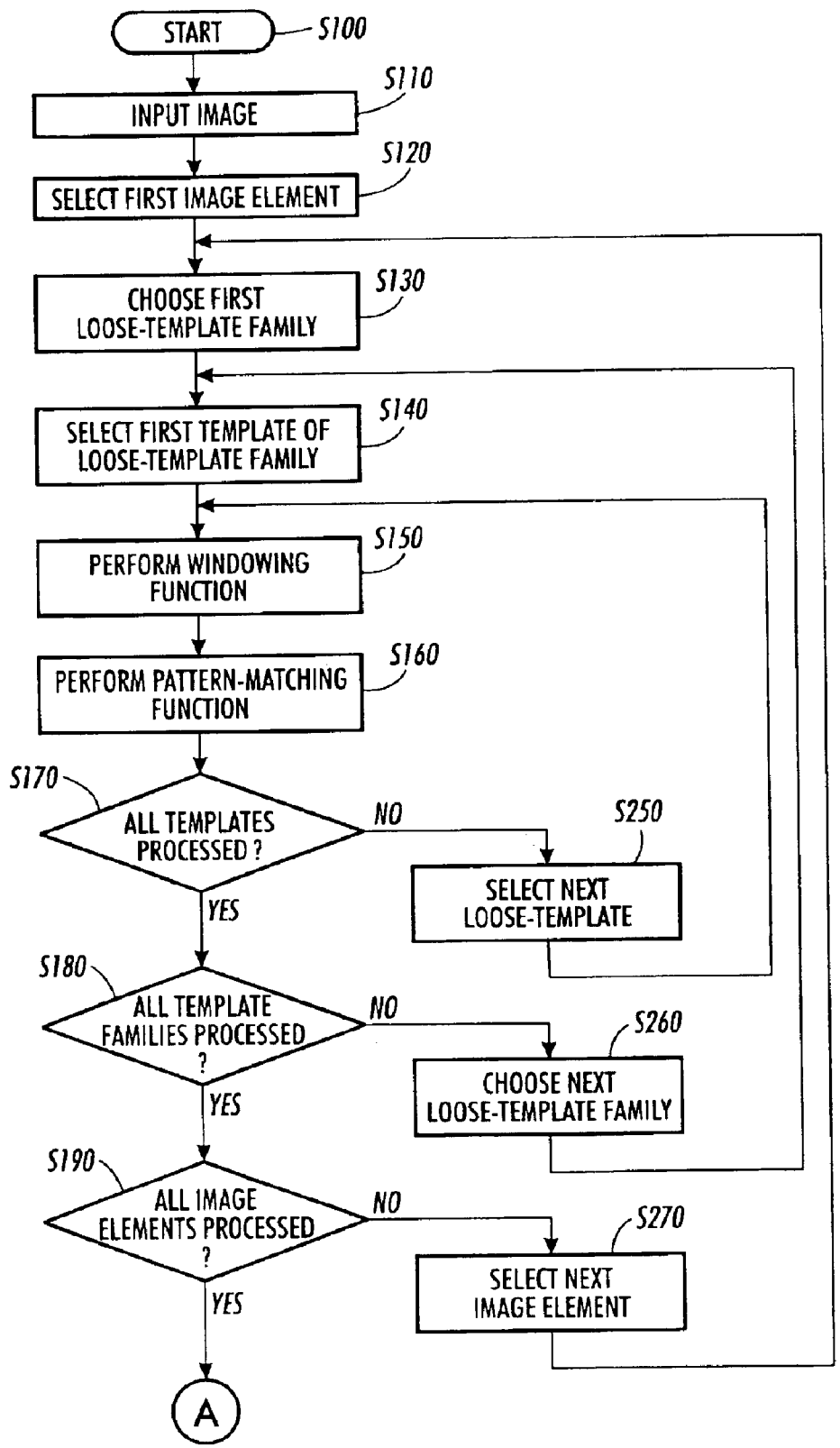
FIGS. 5A and 5B are a flowchart outlining an exemplary embodiment of the methods for processing anti-aliased image data according to this invention.
Figure 5B:
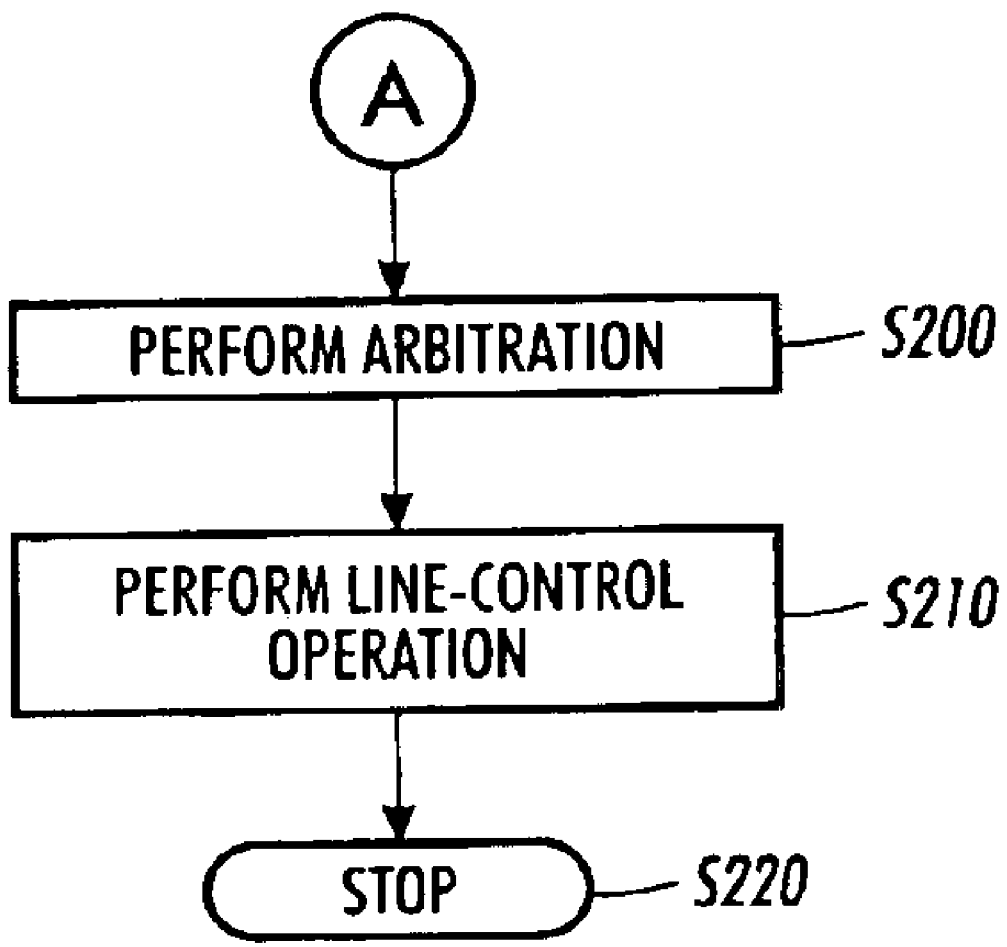

FIGS. 5A and 5B are a flowchart outlining an exemplary method for processing anti-aliased images. Beginning in step S100, control continues to step S110, where an anti-alias source image is input. Next, in step S120, a first pixel, or image element, within the input image is selected. Then, in step S130, a first family of loose-templates such as a set of templates of a predetermined size is selected to be processed. Further, in step S140, a first loose-template of the loose-template family selected in step S130 is selected. As discussed above, the loose-templates can consist of any one- or two-dimensional arrays of image elements having target values and spans, or the loose-templates can include of any number of parameters that can categorize, or recognize, a family of patterns without requiring an exact match to a specific pattern. Control then continues to step S150.

In step S150, a windowing function is performed using a window size based on the size of the loose-template selected in step S140 to produce a windowed image portion of the anti-aliased input data. Next, in step S160, a pattern matching function is performed on the image portion. Again, as discussed above, an element-by-element pattern matching operation can be performed to determine if each individual image element of the extracted image portion extracted in step S150 falls within a predetermined range of acceptable values as defined by a corresponding image element of the selected loose-template. Also, as discussed above, any other alternative pattern matching function based on any number of known or later developed pattern recognition techniques capable of recognizing families of patterns without requiring exact matches can be used without departing from the spirit and scope of this invention. Control then continues to step S170.

In step S170, a determination is made as to whether all of the loose-templates within the selected loose-template family have been processed. If all of the templates within the selected family have been processed, control continues to step S180, otherwise, control jumps to step S250. In step 250, the next loose-template of the selected template family is selected and control jumps back to step S150 where a windowing function is performed based on the on the size of the loose-template selected in step S250.

In step S180, because all loose-templates within the chosen family have been processed, a determination is made as to whether all of the available families of templates have been processed. If all of the template families have been processed, control continues to step S190; otherwise, control jumps to step S260. In step S260, because all families of loose-templates have not been processed, a next loose-template family is selected for processing, and control jumps back to step S140 where a first template of the selected loose-template family is selected for processing.

In step S190, because all of the families of loose-templates have been processed, a determination is made as to whether all of the available image elements within the anti-aliased input image have been processed. If all of the image elements have been processed, control continues to step 200; otherwise, control jumps to step S270. In step 270, the next image element of the anti-aliased input image is selected for processing and control then jumps back to step S130 where the first loose template family is again selected for processing.

In step S200, because all relevant image portions referenced by every image element have been extracted and compared to all of the selected loose-templates, an arbitration technique is performed between the various features and/or feature vectors determined by the previous steps. As discussed above, the arbitration technique can include various filtering operations that discard all but one or two predominant features of interest. Alternatively, in various embodiments, the arbitration technique can produce new features based on amalgams of various recognized features. Furthermore, as discussed above, the arbitration technique can optimally process different screens of features or feature vectors independently, or the arbitration technique can collectively process the different screens. Control continues to step S210.

In step S210, a line-control operation is performed based on the information or instructions provided by the arbitration step of S200. The line-control operation can be any number of operations such as controlling a growth of a line, maintaining a line-width when converting from a first resolution of an input image to a second resolution of an output image or any other line-control operation now known or later developed useful for processing anti-aliased images. Control then continues to step S220 where the process stops.

Figure 6:
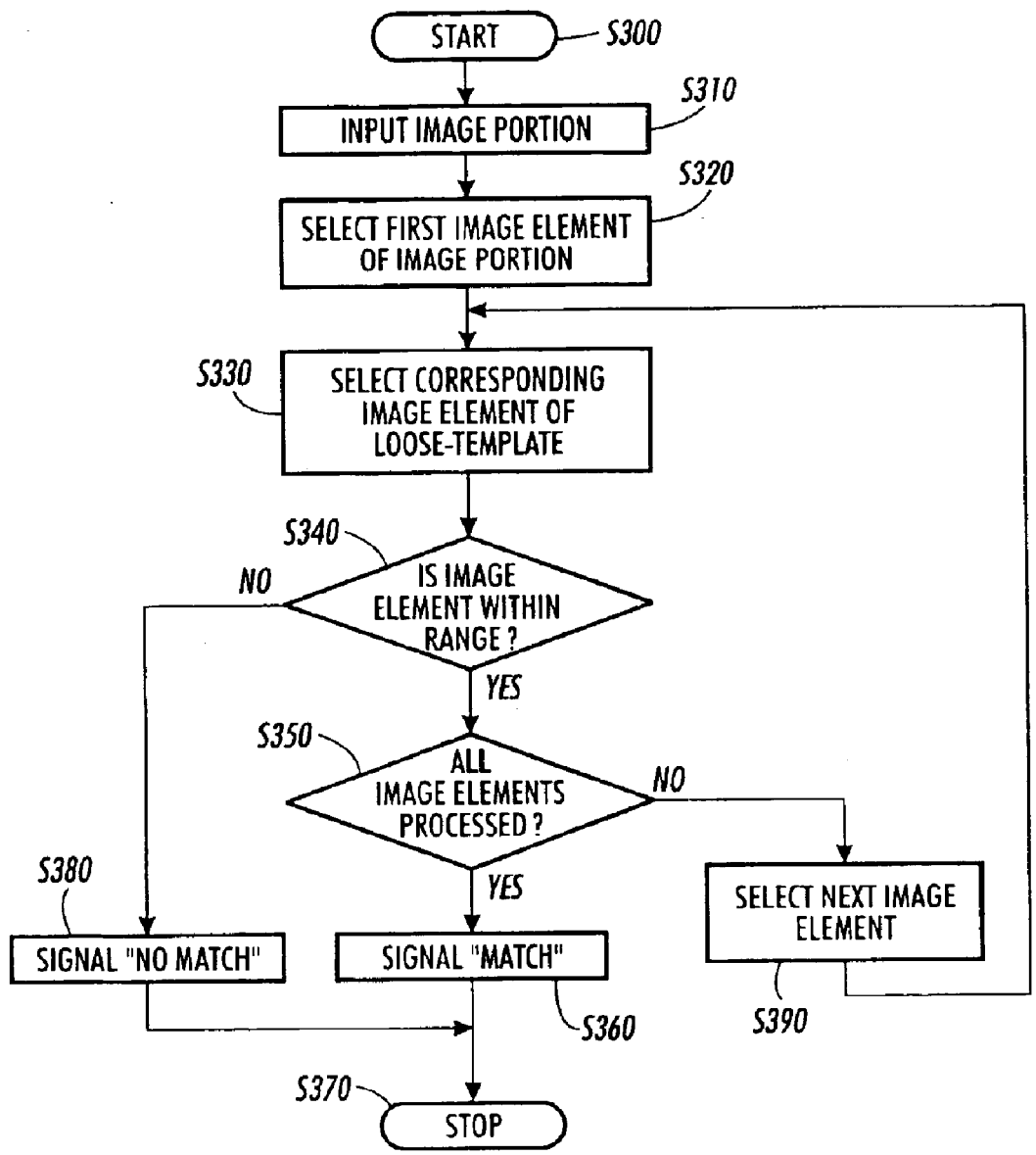
FIG. 6 is a flowchart outlining a first exemplary embodiment of a method for pattern recognition according to this invention.

FIG. 6 is a flowchart outlining an exemplary method for recognizing patterns in anti-aliased image portions. Beginning in step S300, control continues to step S310, where an anti-aliased image portion is input. Next, in step S320, a first pixel, or image element, within the image portion is selected. Then, in step S330, a corresponding image element of a pre-determined loose-template is selected. As described above, loose-template image elements can consist of target values having corresponding spans, or a loose-template image element can consist of any other form of data that can describe a range of values. Control then continues to step S340.

In step S340, a determination is made as to whether the selected image element of the image portion falls within the range of the corresponding loose-template image element. If the selected image element value falls within the corresponding range, control continues to step S350, otherwise control jumps to step S380. In step S380, a "no match" signal is generated, and control continues to step S370 where the process stops.

In step S350, because the value of the selected image element falls within the corresponding range, a next determination is made as to whether all image elements of the image portion have been processed. If all image elements have been processed, control continues to step S360; otherwise, control jumps to step S390. In step S390, the next image element of the image portion is selected, and control jumps back to step S330 where the next corresponding image element of the loose-template is selected.

In step S360, because all image elements of the image portion fall within the corresponding ranges of the loose-template image elements, a "match" signal is generated, and control continues to step S370 where the process stops.

Figure 7:
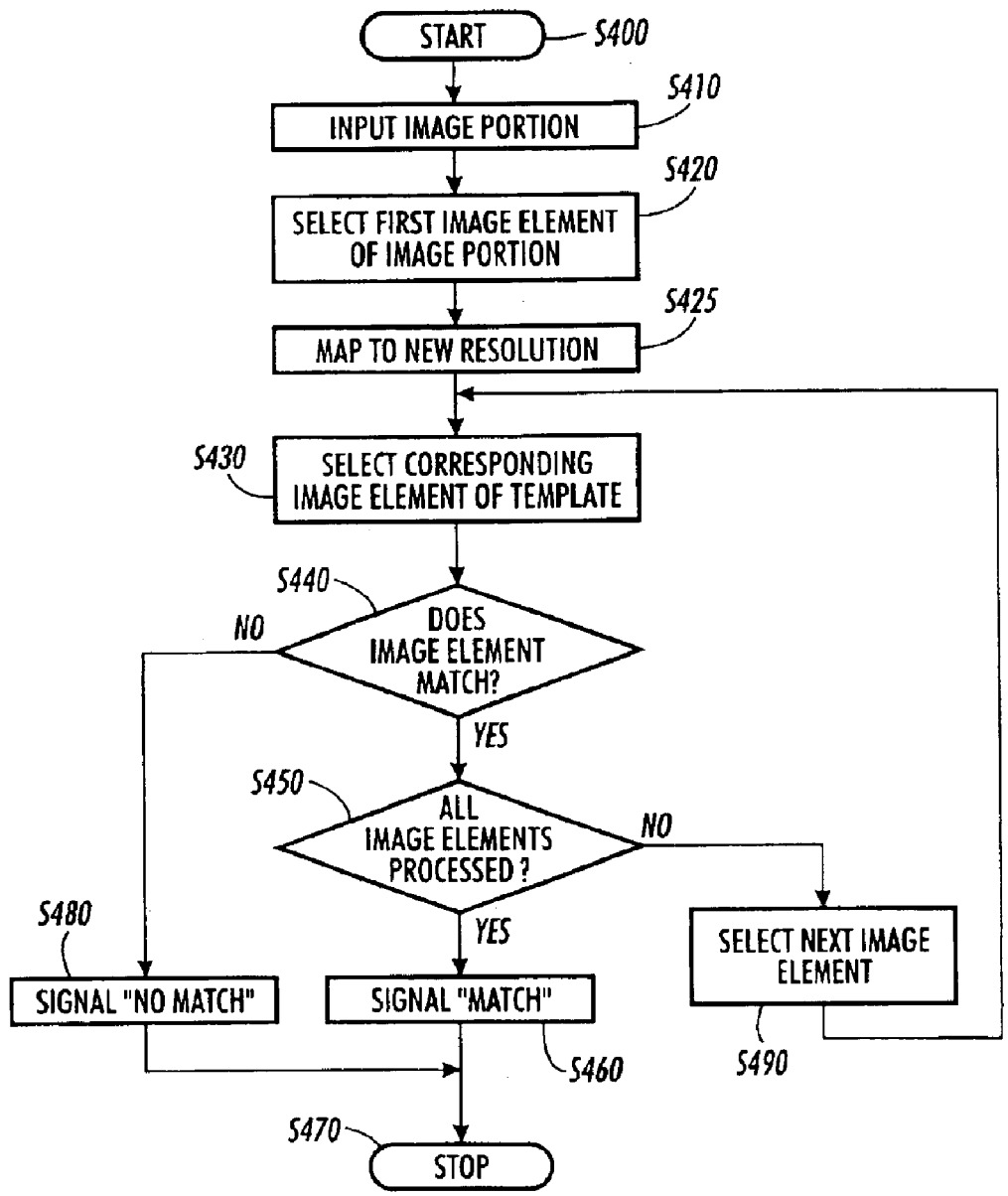
FIG. 7 is a flowchart outlining a second exemplary embodiment of a method for pattern recognition according to this invention.

FIG. 7 is a flowchart outlining a second exemplary method for recognizing patterns in anti-aliased image portions. Beginning is step S400, control continues to step S410, where an anti-aliased image portion is input. Next, in step S420, a first image element of the image portion is selected. Control continues to step S425.

In step S425, the image element selected in step 420 is mapped to a new, lower resolution. While the exemplary technique maps eight-bit gray-level data to four-bit data by truncating the lower four-bits, it should be appreciated that other techniques for resolution mapping including non-linear mapping techniques or techniques based on empirical data can alternatively be used without departing from the spirit and scope of this invention. Control continues to step S440.

In step S440, a determination as to whether the selected image element is within the range of the corresponding loose-template image element. While the exemplary technique performs an element-by-element match of low resolution image elements, it should be appreciated that the low-resolution values can be compared against a predetermined range of low-resolution values as with regular loose-template matching techniques without departing from the spirit and scope of this invention. If the selected image element value matches the corresponding loose-template value or alternatively falls within the loose-template's predetermined range, control continues to step S450, otherwise control jumps to step S480. In step S480, a "no match" signal is generated and control continues to step S470 where the process stops.

In step S450, because the selected image element is within the required range, a next determination is made as to whether all image elements in the image portion have been processed. If all image elements have been processed, control continues to step S460; otherwise, control jumps to step S490. In step S490, the next image element of the image portion is selected, and control jumps back to step S425 where the next image element is mapped to a new, lower resolution.

In step S460, because all image elements have been processed and are within their required predetermined ranges of corresponding image elements of loose-templates, a "match" signal is generated, and control continues to step S470 where the process stops.

Figure 8:
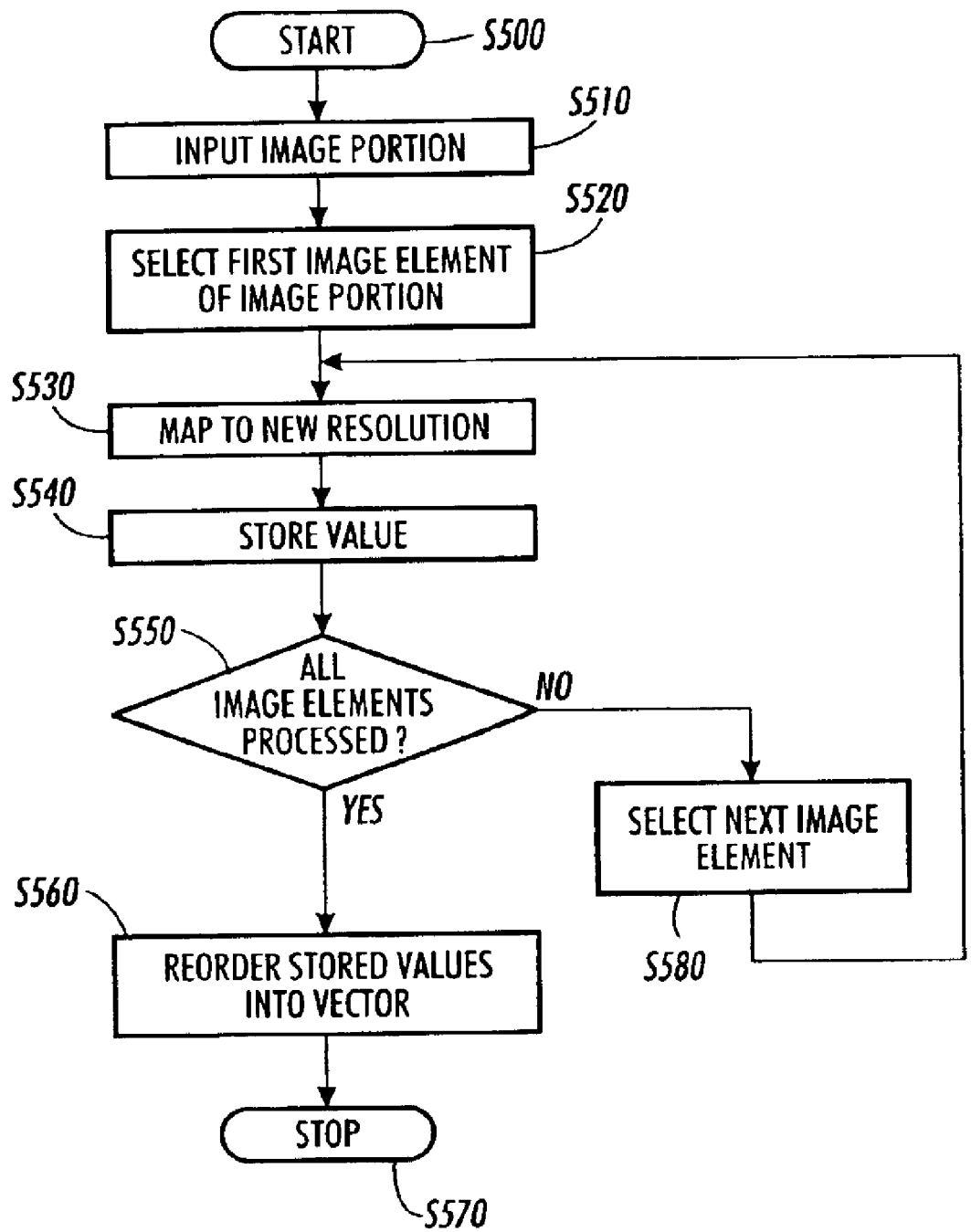
FIG. 8 is a flowchart outlining a third exemplary embodiment of a method for pattern recognition according to this invention.

FIG. 8 is a flowchart outlining a third exemplary operation for recognizing patterns in anti-aliased image portions. Beginning is step S500, control continues to step S510, where an anti-aliased image portion is input. Next, in step S520, a first image element of the image portion is selected. Then, in step S530, the image portion is mapped to a lower resolution. Further, in step S540, the low resolution data is stored. Control continues to step S550.

In step S550, a determination as to whether all the image elements in the image portion have been processed. If all image elements have been processed, control continues to step S560, otherwise control jumps to step S580. In step S580, the next image element of the image portion is selected, and control jumps back to step S530 where the selected image element is mapped to the new, lower resolution.

In step S560, the low resolution data stored in step S540 is reordered in a predetermined fashion to create a feature vector. For example, a one-by-five image portion having four-bit image elements can be reordered to a twenty-bit hexidecimal number, which, as discussed above, can point to a feature state-space, an address located in a computer memory and the like. Control then continues to step S570 where the process stops.

Figure 9:
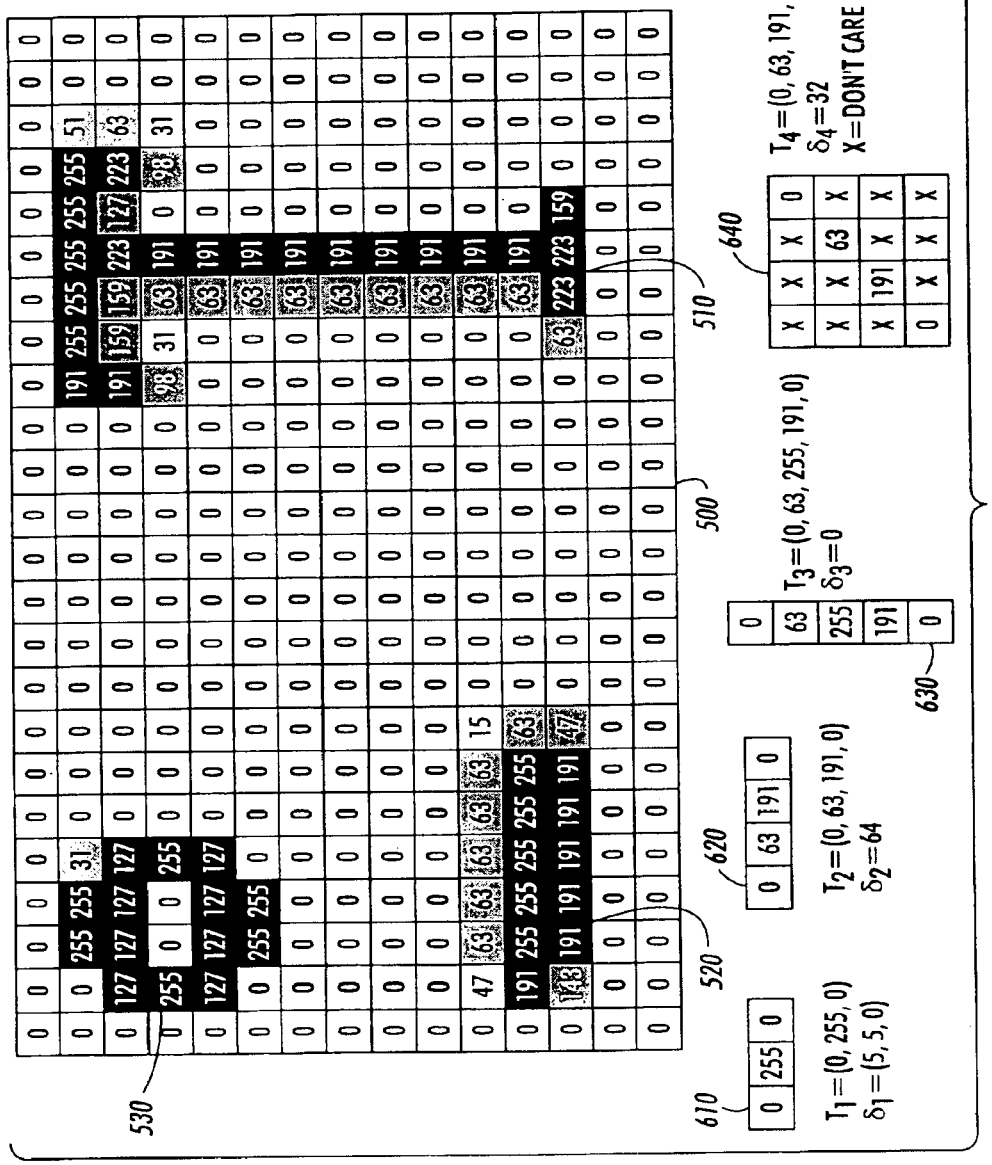
FIG. 9 depicts an anti-aliased digital image and various loose-templates for recognizing features.

FIG. 9 shows a first anti-aliased image 500 having three-hundred and seventy-five image elements that can vary in value from zero to two-hundred and fifty-five. As shown in FIG. 9, the image 500 contains three icons 510, 520 and 530. Also shown in FIG. 9 are four loose-templates 610, 620, 630 and 640. Each loose-template 610–640 has a number of target values $T_1$, $T_2$, $T_3$ and $T_4$ with respective spans $\delta_1$, $\delta_2$, $\delta_3$ and $\delta_4$ describing four sets of loose-template ranges that can be compared to similarly-sized image portions of image 500 to determine whether various features exist within the portions.

Figure 10:
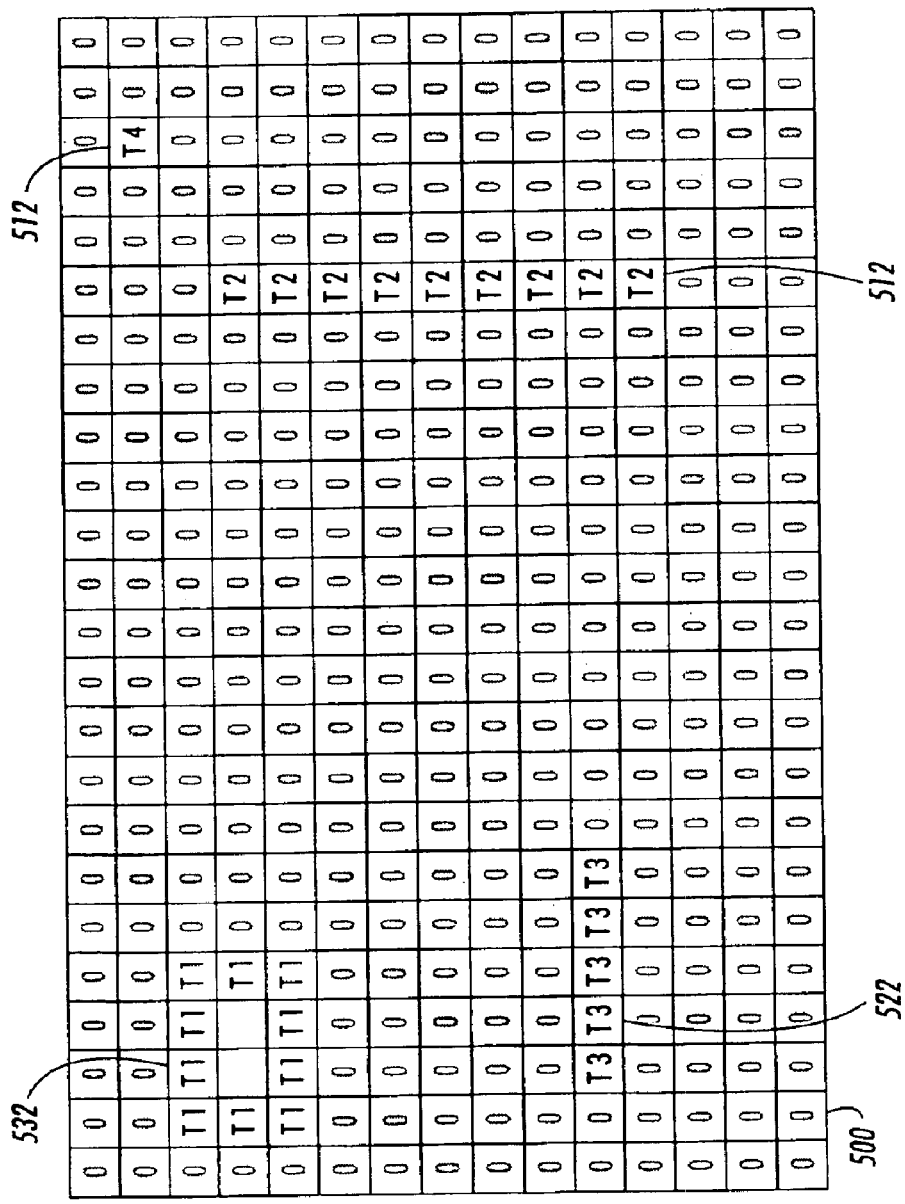
FIG. 10 depicts a map of image features derived from the anti-aliased image and loose-templates of FIG. 9.

FIG. 10 is a feature map, or screen, produced by the anti-aliased image 500 and loose-template 610–640 shown in FIG. 10. As shown in FIG. 10, the three icons 510, 520 and 530 are transformed into three feature groups 512, 522 and 532, respectively.

Figure 11:
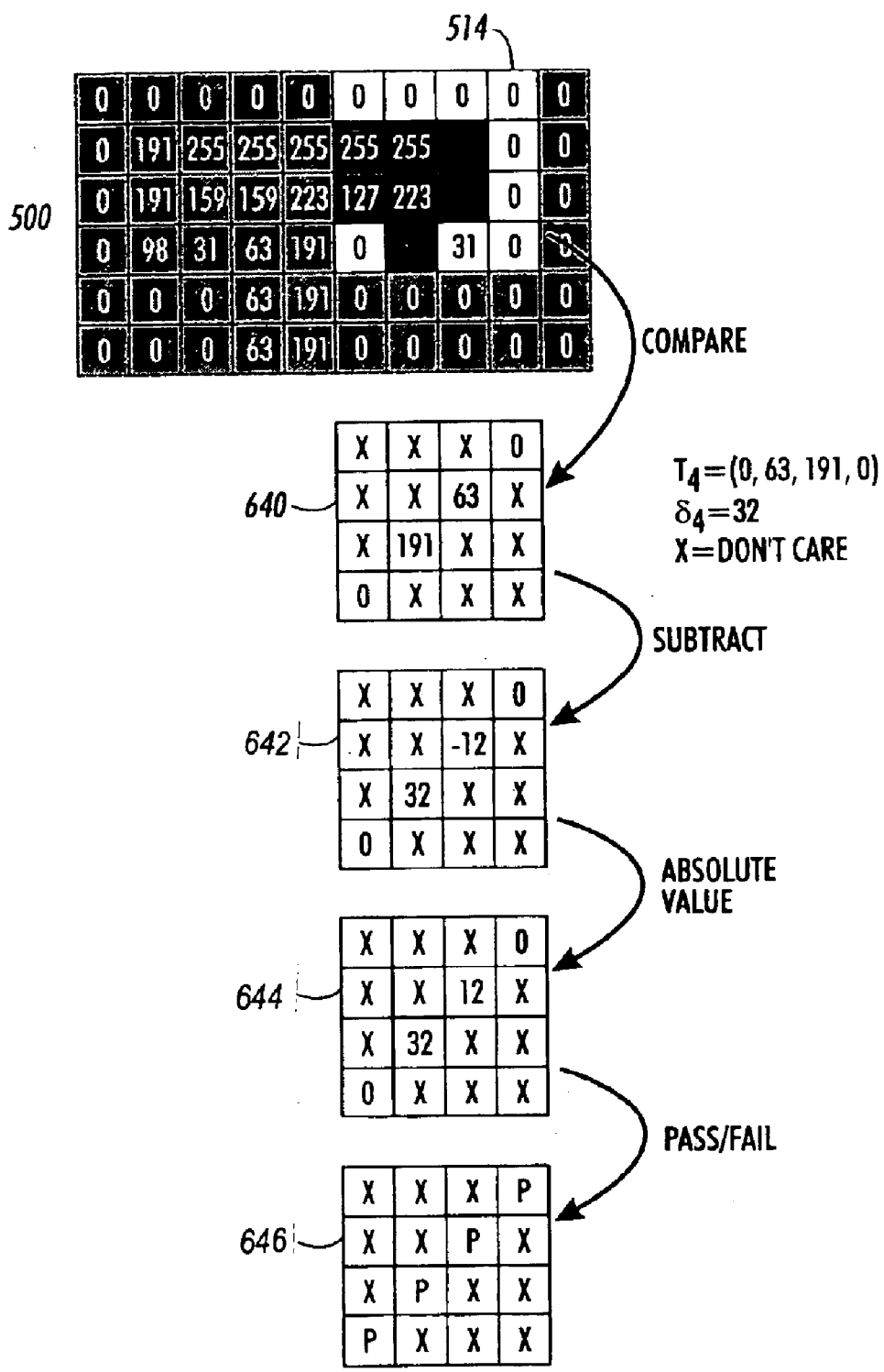
FIG. 11 depicts a windowing and pattern matching/feature recognition function of a first portion of the anti-aliased image of FIG. 9.

FIG. 11 shows an exemplary windowing and pattern recognition operation on a first image portion 514 of the image 500 shown in FIG. 9. As shown in FIG. 11, the first image portion 514 is compared to a loose-template 640, and the difference between each image element of the first image portion 514 A=(0, 51, 223, 0) and respective loose-template image element [$T_4$=(0, 63, 191, 0)] is placed in array 642. Next, the absolute value of each image element of array 642 is determined to produce a second array 644. Each image element of array 644 is then analyzed to determine whether its value is within the predetermined span [$\delta$=32] of each loose-template target value to create a pass/fail array 646. As shown in FIG. 11, because each image element in difference array 644 is within the range of each template image element, the loose-template 640 can produce a positive feature recognition.

Figure 12:
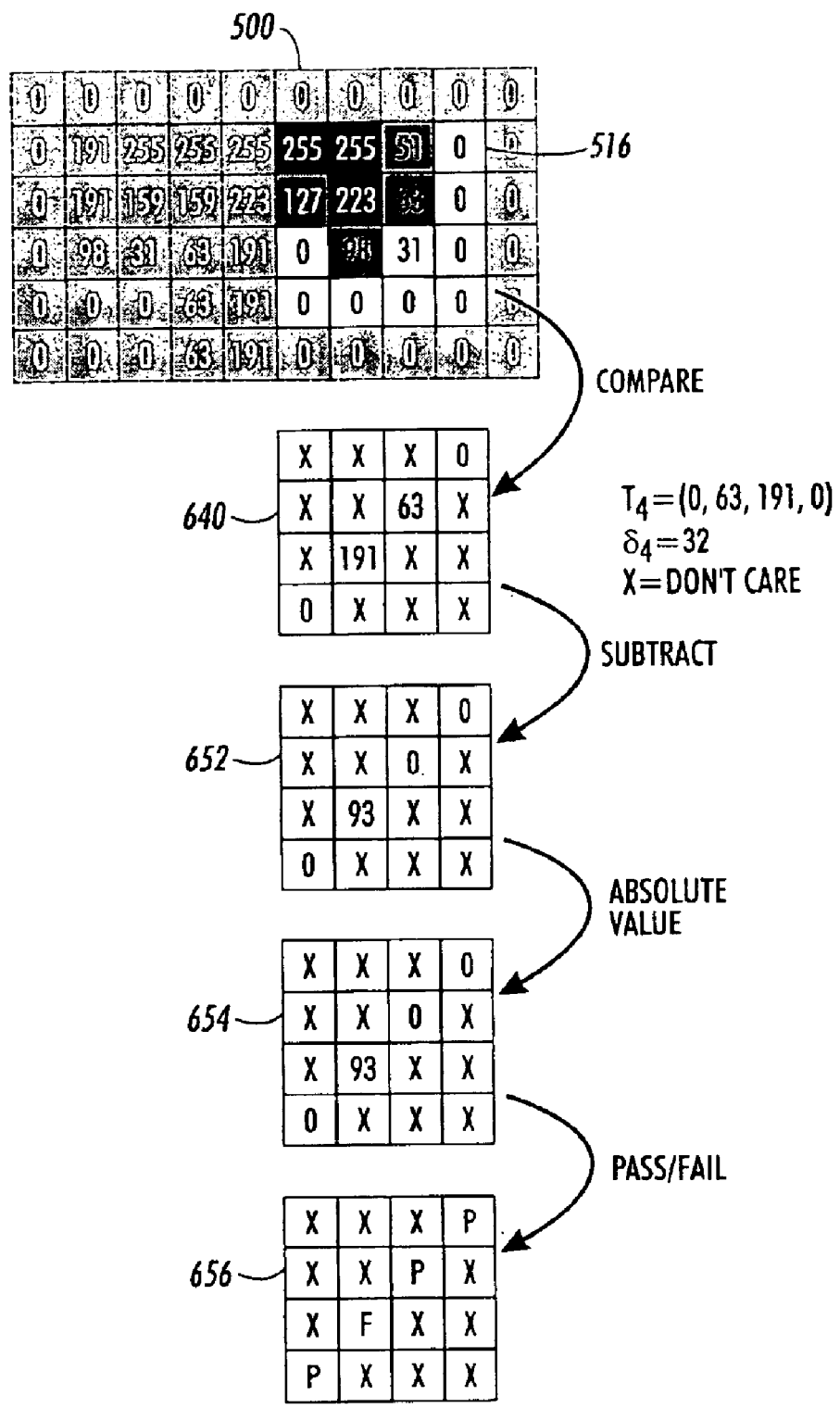
FIG. 12 depicts a windowing and pattern matching/feature recognition function of a second portion of the anti-aliased image of FIG. 9.

FIG. 12 shows an exemplary windowing and pattern recognition operation on a second image portion 516 of image 500. As shown in FIG. 12, the second portion 516 is compared to loose-template 640, and the difference between each image element of the second image portion 516 [A=(0, 63, 98, 0)] and respective loose-template image element $T_4$ =(0, 63, 191, 0) is placed in array 652. Next, the absolute value of each image element of array 652 is taken to produce a second array 654 and, as with FIG. 11, each image element of array 654 is then analyzed to create a pass/fail array 656. As shown in FIG. 12, because the third portion image element [98] is beyond its respective range [191±32], a negative feature recognition results.

Figure 13:
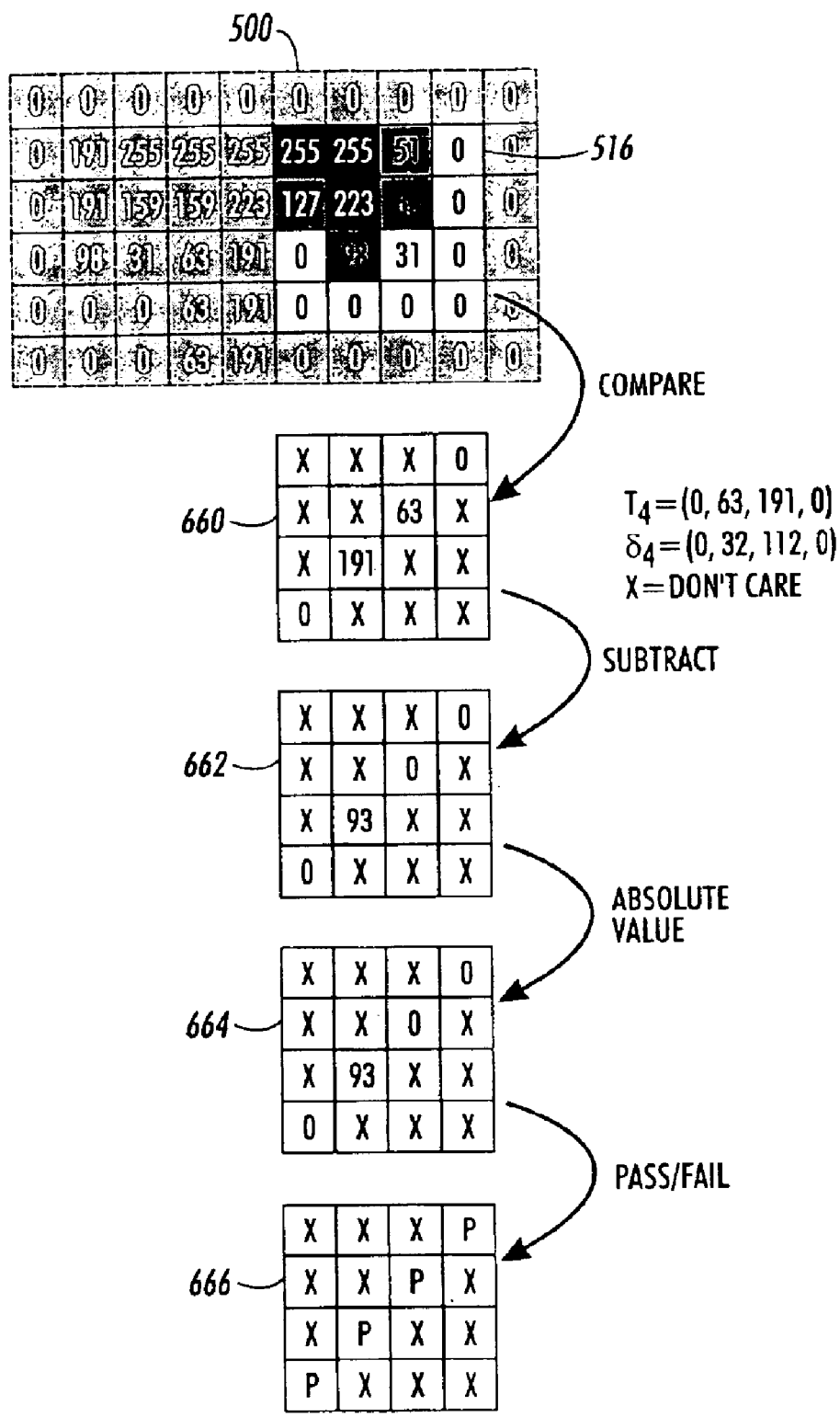
FIG. 13 depicts a second windowing and pattern matching/feature recognition function of the second portion of the anti-aliased image of FIG. 9.

FIG. 13 shows a second exemplary windowing and pattern recognition operation on the second image portion 516 of FIG. 12. As shown in FIG. 13, the second image portion 516 is compared to a loose-template 660, and the difference between each image element of portion 514 A'=(0, 63, 98, 0) and loose-template image element $T'_4$=(0, 63, 191, 0) is placed in array 662. Next, the absolute value of each image element of array 662 is determined to produce a second array 644 and, as with FIG. 12, each image element of array 654 is then analyzed to create a pass/fail array 646. However, unlike the operation shown in FIG. 12, the spans of each image element of template 660 δ'₄=(0, 32, 112, 0) are independent from each other. As a result of the greater span of the third image element, as compared to the respective third image element of the loose-template 640 shown in FIG. 12, each image element of portion A=(0, 63, 98, 0) falls within its respective range of the loose-template 660 T'₄=(0, 63±32, 191±112, 0) to produce a positive feature recognition.

Figure 14:
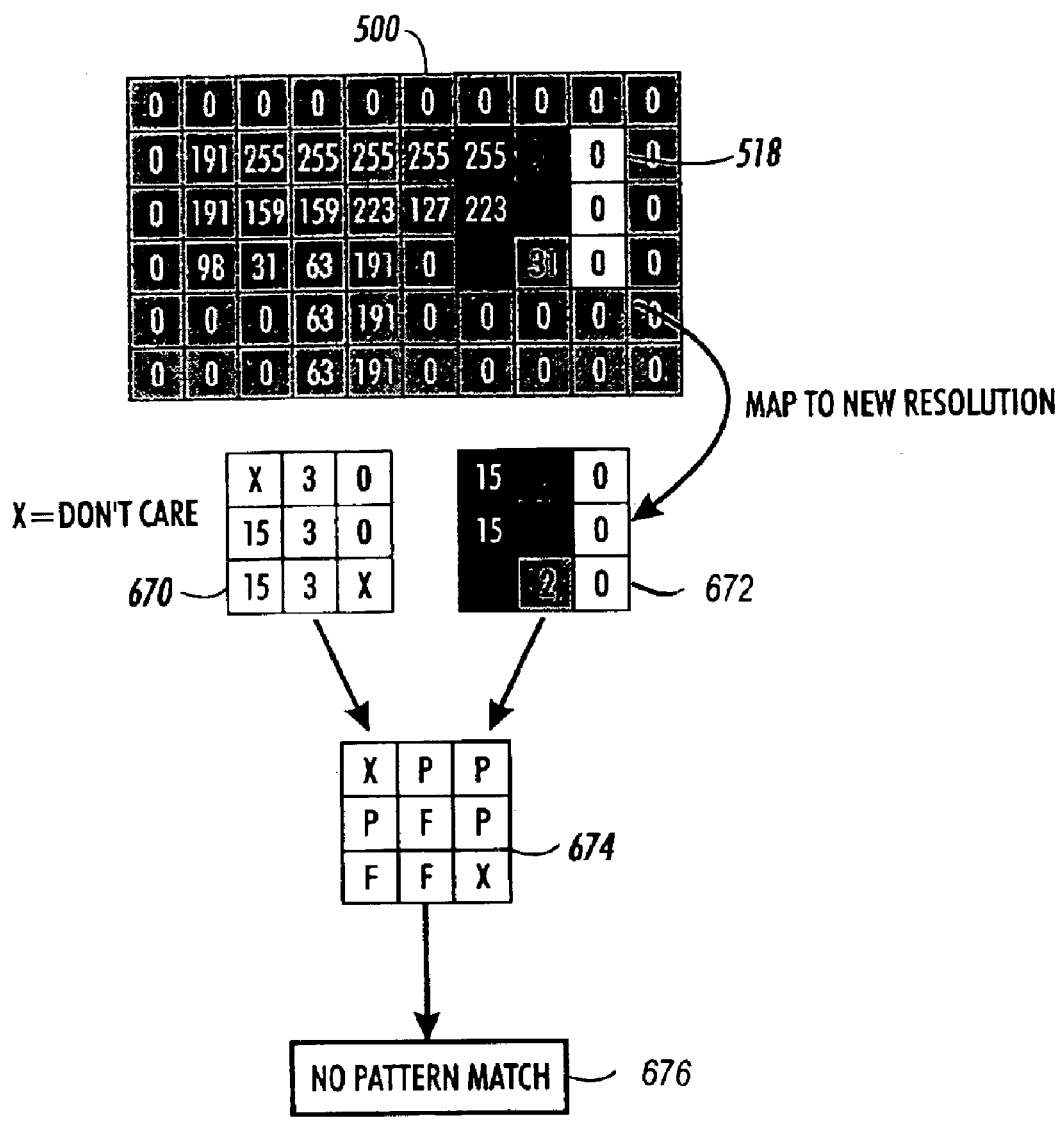
FIG. 14 depicts a third windowing and pattern matching/feature recognition function on a third portion of the anti-aliased image of FIG. 9.

FIG. 14 shows another exemplary windowing and pattern recognition operation on a third image portion 518. As shown in FIG. 14, each image element of the portion 518 is mapped to a new, low-resolution array 672. As discussed above, lowering the resolution of the portion 518 can allow each image element of array 672 to match a low-resolution template image element without requiring an exact eight-bit match because ranges become inherently incorporated into the templates by virtue of the lower resolution. The low-resolution array 672 then can be compared to template 670, to create a pass/fail array 674 which, in turn, can produce a "match/no match" indication 676.

Figure 15:
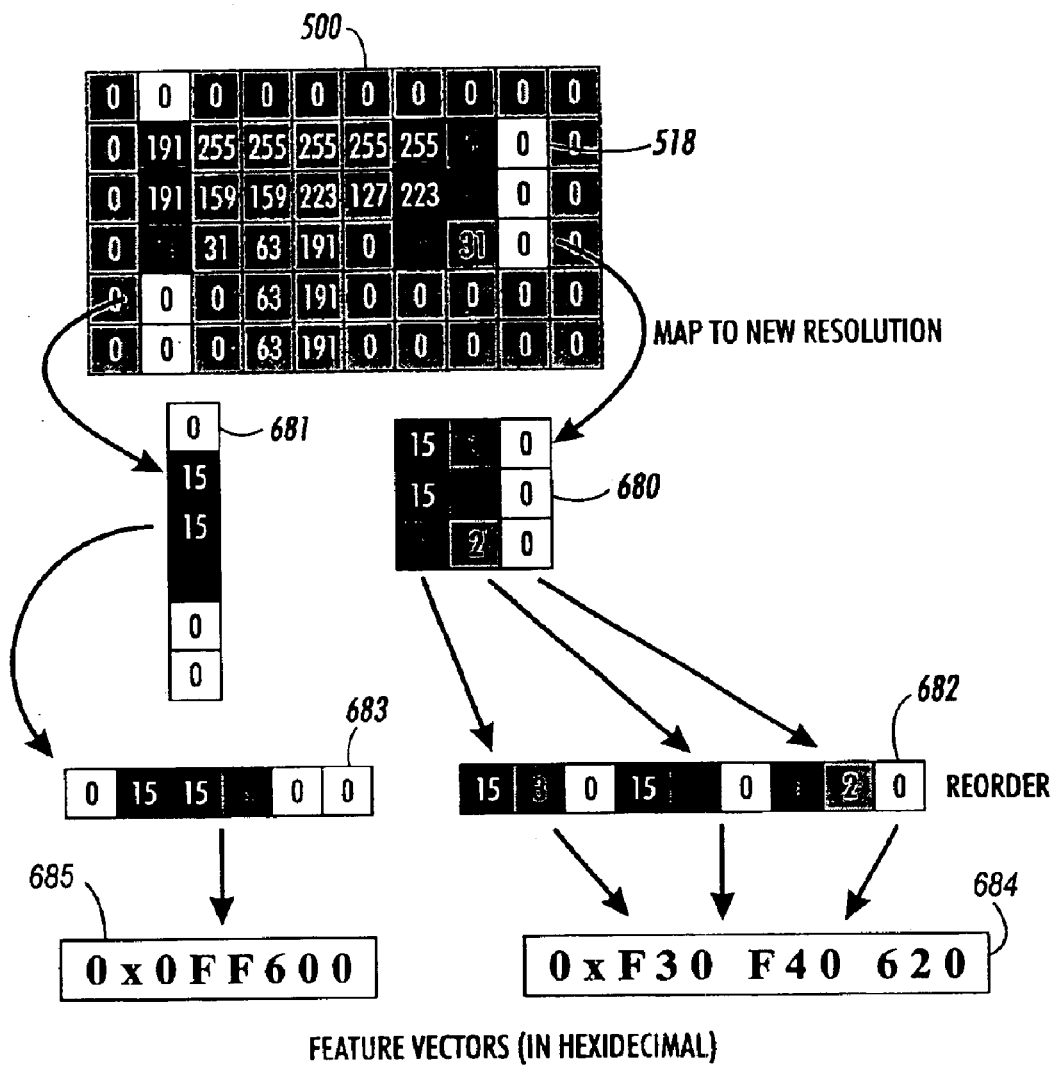
FIG. 15 depicts a fourth windowing and pattern matching/feature recognition function on the third and fourth portion of the anti-aliased image of FIG. 9.

FIG. 15 shows another exemplary low-resolution approach to windowing and pattern recognition operation on the third image portion 518 shown in FIG. 14 as well as a fourth image portion 519. As shown in FIG. 15, each image element of the third image portion 518 is mapped to low-resolution array 672 and each image element of the fourth image portion 519 is similarly mapped to a second low-resolution array 681. However, instead of comparing each low-resolution array 680 and 681 to predetermined templates, the image elements are arranged into respective second arrays 682 and 683, which can be used to create vectors 684 and 685. As discussed above, vectors 684 and 685 can act as pointers to state spaces or memory locations, or the vectors 684 and 685 can alternatively be directly compared to predetermined values.

Figure 16:
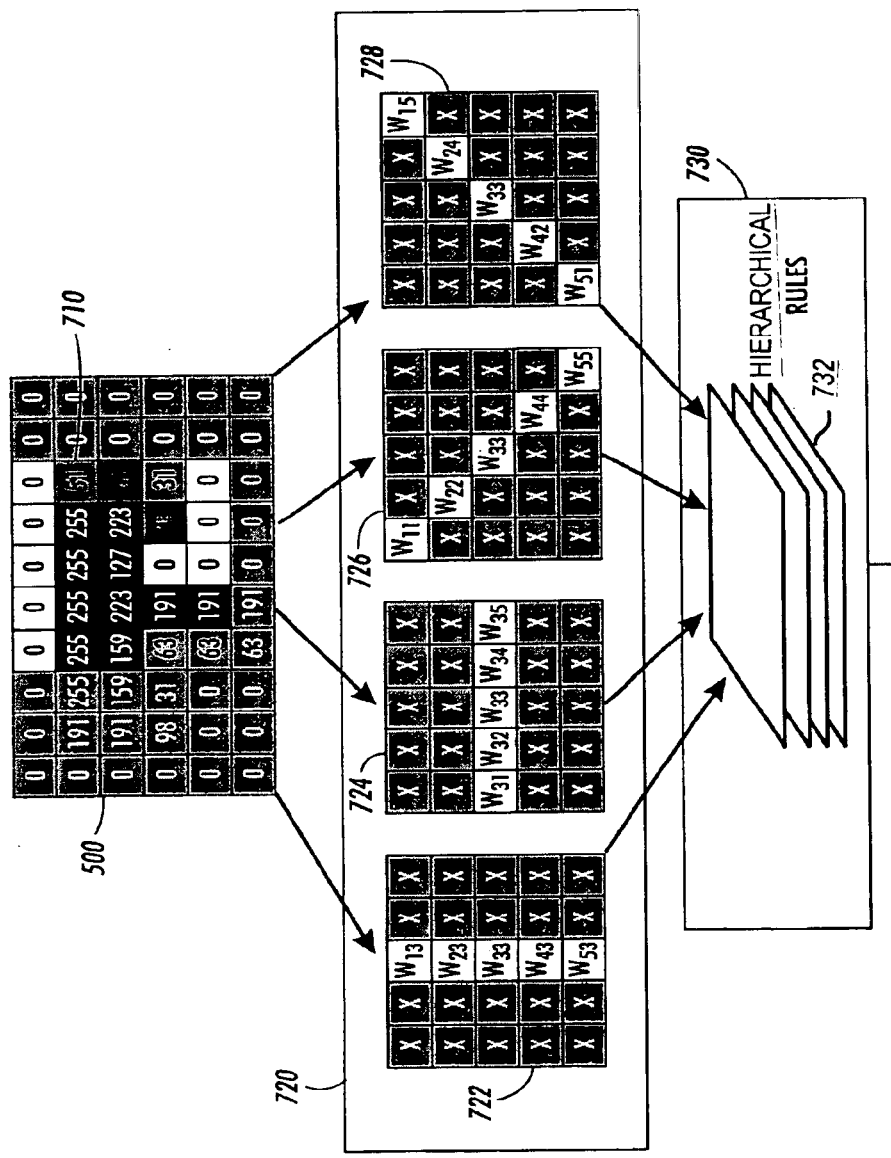
FIG. 16 depicts a first arbitration operation performed on a number of features derived from various pattern matching/feature recognition operations.

FIG. 16 depicts an exemplary arbitration operation on an image portion 710 in image 500. As shown in FIG. 16, a set of four features 722–728 in screen 720 are derived and provided to arbitrator 730. The arbitrator 730 can then operate on the features 722–728 using a set of rules 732 to produce one or more decision vectors 734. While the exemplary arbitrator 730 can produce a set of decision vectors 734, as discussed above, the arbitrator 730 can alternative produce sets of filtered features or create new features representing amalgams of features presented to it.

Figure 17:
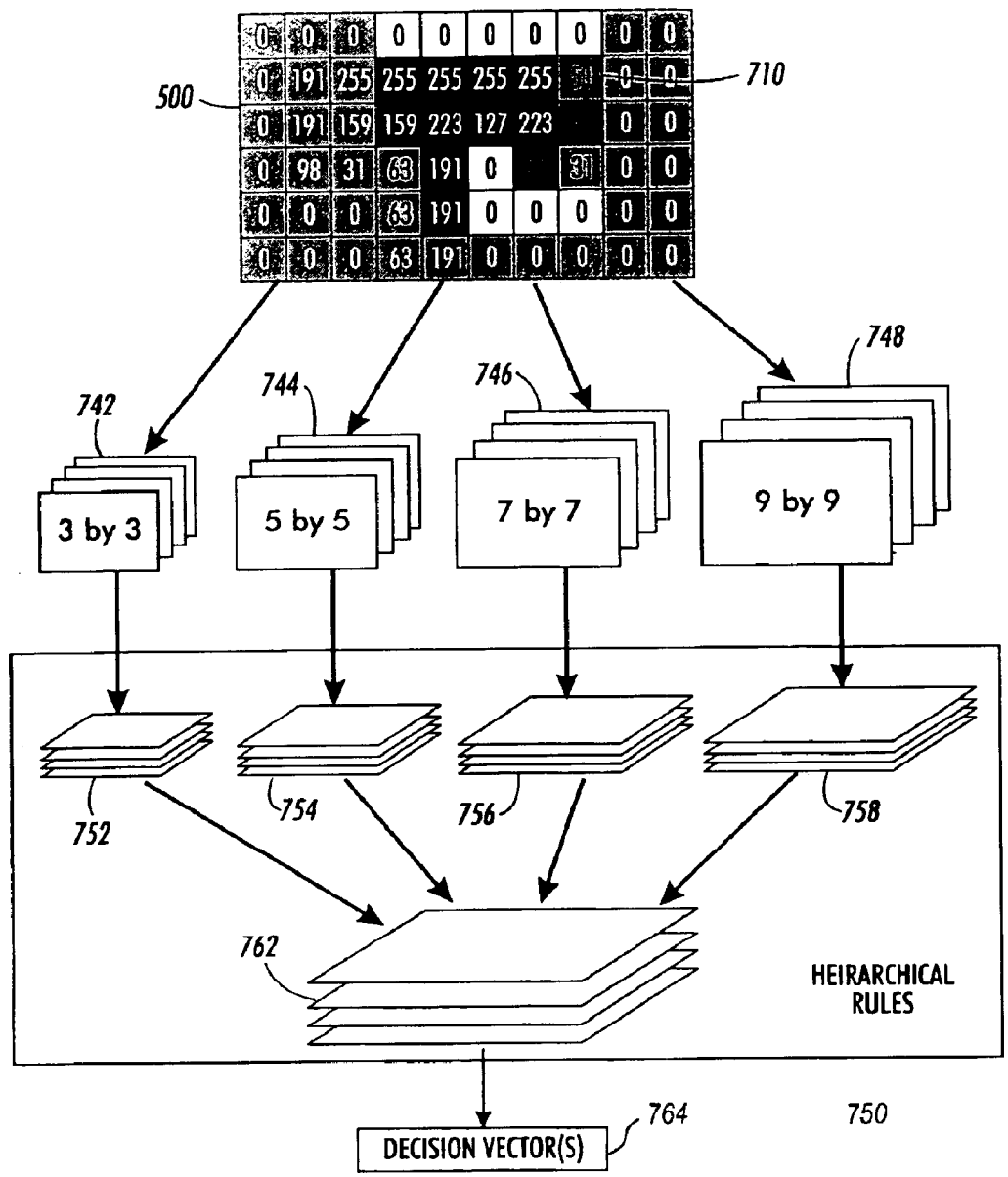
FIG. 17 depicts a second arbitration operation performed on a number of screens of features derived from various pattern matching/feature recognition operations.

FIG. 17 depicts a second exemplary arbitration operation on the image portion 710 in image 500. As shown in FIG. 17, four screens of features 7421–748 are extracted and provided to arbitrator 750. The arbitrator 750 can then operate on the separate screens of features 742–748 using four separate sets of rules 752–758 to each produce one or more decision vectors (not shown). Rule set 762 can further operate the decision vectors provided by rule sets 752–758 to produce one or more final decision vectors 764. Again, while the exemplary arbitrator 750 produces sets of decision vectors 764, the arbitrator 750 can alternative act as a filter to remove extraneous features or create new features representing amalgams of features of other separate features.

Figure 18:
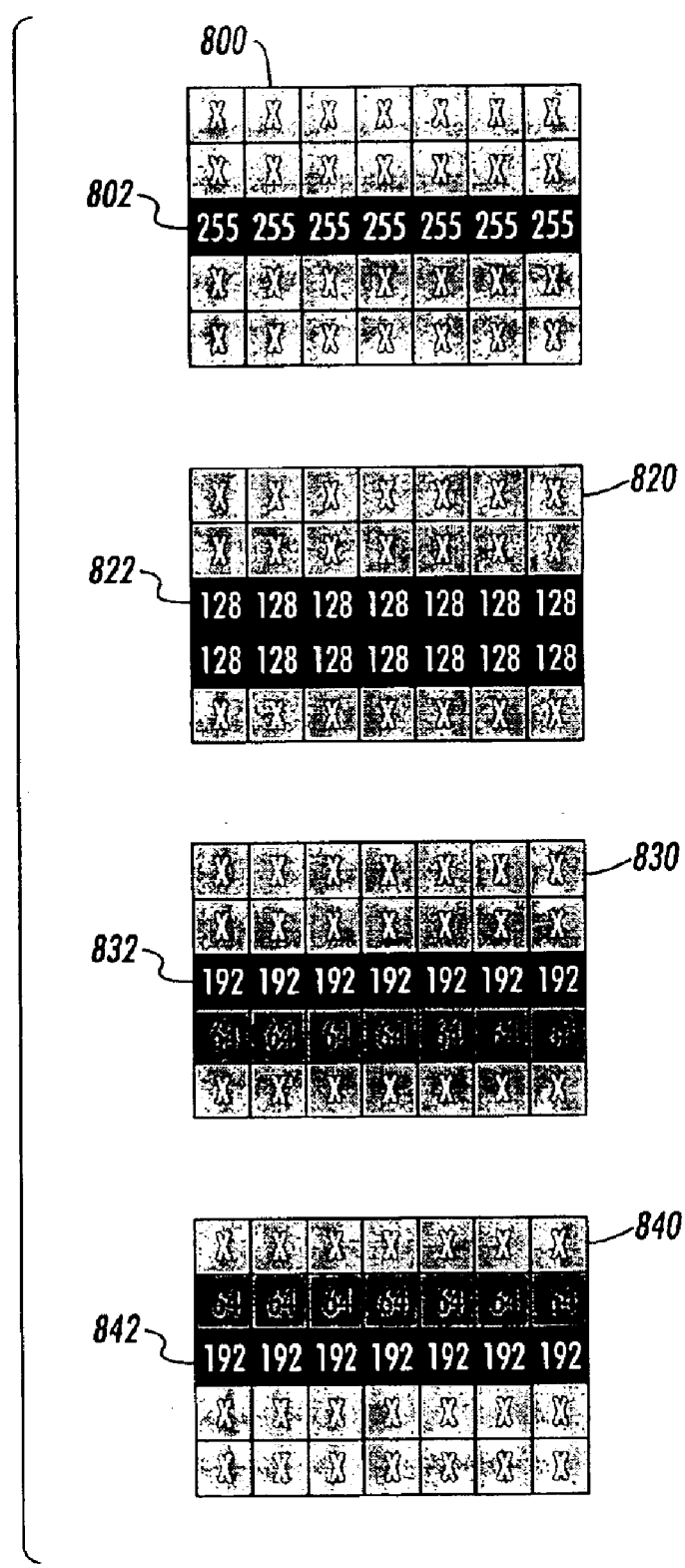
FIG. 18 depicts a line-art image and three possible line-growth operations produced by the various methods and systems of this invention.

FIG. 18 depicts three exemplary line growth operations that can be performed on a single image according to any number of predetermined rules and instructions controlling line-widths. As shown in FIG. 18, an input image 800 containing a line 802 can produce at least separate and unique anti-aliased output images 820, 830 and 840 each containing various anti-aliased lines 822, 832 and 842.

While FIG. 18 depicts a dark line against a light background, as discussed above, it should be appreciated that the line growth operation of FIG. 18 can similarly be extended to images having light lines, features where characters are against a darker background.

In the exemplary embodiment shown in FIG. 3, the digital processing system 200 is implemented on a programmed micro-controller and peripheral integrated circuit elements. However, the digital processing system 200 can also be implemented on a general purpose computer, a special purpose computer, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the digital processing system of FIG. 3 or the flowcharts of FIGS. 5A through 8 can be used to implement the digital processing system 200.

In the exemplary embodiment shown in FIG. 4, the anti-aliased image processing system 400 is implemented on a programmed general purpose computer. However, the anti-aliased image processing system 400 can also be implemented on a special purpose computer, a programmed microprocessor or microcontroller and peripheral integrated circuit elements, an ASIC or other integrated circuit, a digital signal processor, a hardwire electronic or logic circuit such as discrete element circuit, a programmable logic device such as PLD, PLA, FPGA or PAL, or the like. In general, any device, capable of implementing a finite state machine that is in turn capable of implementing the digital processing system of FIG. 4 or the flowcharts of FIGS. 5A through 8 can be used to implement the anti-aliased image processing system 400.

As shown in FIG. 4, the memory 420 is preferably implemented using static or dynamic RAM. However, the memory 420 can also be implemented using a floppy disk and disk drive, a writable optical disk and disk drive, a hard drive, flash memory or the like.

It should be understood that each of the circuits shown in FIGS. 3 and 4 can be implemented as portions of a suitably programmed general personal computer. Alternatively, each of the circuits shown in FIGS. 3 and 4 can be implemented as physically distinct hardware circuits within an ASIC, or using a FPGA, a PLD, a PLA or a PAL, or using discrete logic elements or discrete circuit elements. The particular form each of the circuits shown in FIGS. 3 and 4 will take is a design choice and will be obvious and predictable to those skilled in the art.

Moreover, the digital image processing systems 200 and/or 400 can be implemented as software executing on a programmed general purpose computer, a special purpose computer, a microprocessor or the like. In this case, the digital imaging processing systems 200 and/or 400 can be implemented as a routine embedded in a printer driver, as a resource residing on a server, or the like. The digital image processing systems 200 and/or 400 can also be implemented by physically incorporating it into a software and/or hardware system, such as the hardware and software systems of a printer or a digital photocopier.

What is claimed is:

1. A method for processing anti-aliased images comprising:
    comparing at least one image portion of an anti-aliased input image against one or more loose-templates to produce a comparison image; and
    processing the comparison image to determine whether a match condition is satisfied.

2. The method of claim 1, wherein the step of processing controls at least one or more line-widths of the comparison image.

3. The method of claim 1, wherein the step of comparing the anti-aliased image includes:
extracting the at least one image portion from the anti-aliased input image; and
performing a pattern matching operation between at least one loose-template and the at least one image portion to produce a screen containing at least one or more features.

4. The method of claim 3, wherein the step of comparing further includes arbitrating between at least two or more features in the screen.

5. A method for processing anti-aliased images, comprising:
characterizing an anti-aliased input image using one or more loose-templates; and
processing the characterized image to affect a second image, wherein the step of characterizing the anti-aliased image includes:
extracting one or more image portions from the anti-aliased input image; and
performing a pattern matching operation between at least one loose-template and at least one image portion to produce a screen containing at least one or more features, wherein the step of characterizing further includes arbitrating between at least two or more features in the screen, and the step of arbitrating effectively eliminates at least one feature.

6. A method for processing anti-aliased images, comprising:
characterizing an anti-aliased input image using one or more loose-templates; and
processing the characterized image to affect a second image, wherein the step of characterizing the anti-aliased image includes:
extracting one or more image portions from the anti-aliased input image; and
performing a pattern matching operation between at least one loose-template and at least one image portion to produce a screen containing at least one or more features, wherein the step of characterizing further includes arbitrating between at least two or more features in the screen, and the step of arbitrating produces a new feature.

7. A method for processing anti-aliased images, comprising:
characterizing an anti-aliased input image using one or more loose-templates; and
processing the characterized image to affect a second image, wherein the step of characterizing the anti-aliased image includes:
extracting one or more image portions from the anti-aliased input image; and
performing a pattern matching operation between at least one loose-template and at least one image portion to produce a screen containing at least one or more features, wherein the step of characterizing further includes arbitrating between at least two or more features in the screen, and the step of characterizing further includes arbitrating between at least two or more screens.

8. The method of claim 1, wherein the step of comparing further includes producing one or more feature vectors.

9. The method of claim 1, wherein the comparison image is an anti-aliased image.

10. The method of claim 1, wherein the step of comparing includes reducing a resolution of at least a portion of the anti-aliased input image.

11. The method of claim 10, further comprising comparing the anti-aliased image portion to at least one template.

12. The method of claim 2, wherein controlling the line-width of at least one of the one or more lines of the comparison image includes controlling a growth of the at least one line-width.

13. The method of claim 12, wherein controlling the line-widths uses at least a look-up table.

14. An apparatus for processing images comprising:
at least one loose-template; and
a control device that produces a comparison image based on comparing the at least one loose-template against an anti-aliased image to determine whether a match condition is satisfied.

15. The apparatus of claim 14, wherein the control device controls at least one or more line-widths of the comparison image.

16. The apparatus of claim 14, further comprising:
a windowing device that extracts one or more image portions from the anti-aliased image; and
a pattern matching device that performs at least one pattern matching operation between the at least one loose-template and at least one anti-aliased image portion to produce a screen containing at least one or more features.

17. The apparatus of claim 16, further comprising an arbitration device that arbitrates between at least two or more features in the screen.

18. An apparatus for processing images, comprising:
one or more loose-templates;
a control device that affects a second image based on the one or more loose-templates and an anti-aliased image;
a windowing device that extracts one or more image portions from the anti-aliased image;
a pattern matching device that performs at least one pattern matching operation between at least one loose-template and at least one anti-aliased image portion to produce a screen containing at least one or more features; and
an arbitration device that arbitrates between at least two or more features in the screen, wherein the arbitration device effectively eliminates at least one feature.

19. An apparatus for processing images, comprising:
one or more loose-templates;
a control device that affects a second image based on the one or more loose-templates and an anti-aliased image;
a windowing device that extracts one or more image portions from the anti-aliased image;
a pattern matching device that performs at least one pattern matching operation between at least one loose-template and at least one anti-aliased image portion to produce a screen containing at least one or more features; and
an arbitration device that arbitrates between at least two or more features in the screen, wherein arbitration device produces a new feature.

20. An apparatus for processing images, comprising:
one or more loose-templates;
a control device that affects a second image based on the one or more loose-templates and an anti-aliased image;
a windowing device that extracts one or more image portions from the anti-aliased image;
a pattern matching device that performs at least one pattern matching operation between at least one loose-template and at least one anti-aliased image portion to produce a screen containing at least one or more features; and an arbitration device that arbitrates between at least two or more features in the screen, wherein the arbitration device further arbitrates between at least two or more screens.

21. The apparatus of claim 14, wherein the control device produces one or more feature vectors based on the anti-aliased input image and one or more loose-templates.

22. The apparatus of claim 14, wherein the comparison image is a second anti-aliased image.

23. The apparatus of claim 14, wherein the windowing device reduces a resolution of at least a portion of the anti-aliased image.

24. A method for processing anti-aliased images comprising:

comparing at least one image portion of an anti-aliased input image against one or more loose-templates to produce a comparison image, each loose-template having a plurality of image elements, wherein at least one of the image elements has a range greater than one; and processing the comparison image to determine whether a match condition is satisfied.

25. An apparatus for processing images comprising:

one or more loose-templates each having a plurality of image elements, wherein at least one image element has a range greater than one; and a control device that produces a comparison image based on comparing the at least one loose-template against an anti-aliased image to determine whether a match condition is satisfied.

26. The method of claim 1, wherein the step of comparing includes:

determining a characteristic relation between the at least one portion of the comparison image and the template to produce a characteristic determination;

comparing the characteristic determination against a template threshold; and determining whether the characteristic determination satisfies a template comparison condition based on comparing against the template threshold.

27. The method of claim 26, wherein at least one of the one or more loose-templates contains a plurality of template elements, and the template threshold contains a uniform threshold value for the plurality of template elements.

28. The method of claim 26, wherein at least one of the one or more loose-templates contains a plurality of template elements, and the template threshold contains a corresponding threshold values for each template element of the plurality of template elements.

29. The apparatus of claim 14, wherein the control device includes:

a relating device that determines a characteristic relation between the at least one portion of the comparison image and the template to produce a characteristic determination;

a comparing device that compares the characteristic determination against a template threshold; and a satisfying device that determines whether the characteristic determination satisfies a template comparison condition based on comparing against the template threshold.

30. The apparatus of claim 29, wherein at least one of the one or more loose-templates contains a plurality of template elements, and the template threshold contains a uniform threshold value for the plurality of template elements.

31. The apparatus of claim 29, wherein at least one of the one or more loose-templates contains a plurality of template elements, and the template threshold contains a corresponding threshold values for each template element of the plurality of template elements.

32. The method of claim 26, wherein the template includes a plurality of template elements, each template element having a target value and a span.

33. The apparatus of claim 29, wherein the template includes a plurality of template elements, each template element having a target value and a span.

* * * * *